(12) United States Patent
Itoh et al.

(10) Patent No.: US 7,740,241 B2
(45) Date of Patent: Jun. 22, 2010

(54) SHEET TRANSPORTING DEVICE, AND AUTOMATIC DOCUMENT FEEDER AND IMAGE FORMING APPARATUS PROVIDED WITH THE SAME

(75) Inventors: Manabu Itoh, Nara (JP); Satoshi Murakami, Yamatokoriyama (JP); Kazumasa Tonami, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 229 days.

(21) Appl. No.: 12/017,082

(22) Filed: Jan. 21, 2008

(65) Prior Publication Data
US 2008/0284093 A1 Nov. 20, 2008

(30) Foreign Application Priority Data
Jan. 26, 2007 (JP) ............................. 2007-016650

(51) Int. Cl.
*B65H 7/12* (2006.01)
(52) U.S. Cl. ............... 271/262; 271/270; 271/258.02; 271/10.02
(58) Field of Classification Search ............... 271/262, 271/263, 270, 258.01, 265.04
See application file for complete search history.

(56) References Cited
U.S. PATENT DOCUMENTS

| | | | |
|---|---|---|---|
| 6,554,275 B1 * | 4/2003 | Tranquilla | 271/259 |
| 6,836,640 B2 * | 12/2004 | Isemura et al. | 399/388 |
| 7,270,325 B2 * | 9/2007 | Sano et al. | 271/262 |
| 7,270,326 B2 * | 9/2007 | Mitsuya et al. | 271/265.04 |
| 7,293,769 B2 * | 11/2007 | Asari et al. | 271/258.01 |
| 7,347,417 B2 * | 3/2008 | Kutzer | 271/262 |
| 7,537,212 B2 * | 5/2009 | Mitsuya et al. | 271/258.02 |
| 7,611,143 B2 * | 11/2009 | Walsh et al. | 271/265.02 |
| 2004/0265031 A1 | 12/2004 | Ueda | |

FOREIGN PATENT DOCUMENTS

| | | |
|---|---|---|
| JP | 2003-072988 | 3/2003 |
| JP | 2004-323143 | 11/2004 |
| JP | 2006-044906 | 2/2006 |

* cited by examiner

*Primary Examiner*—Patrick Mackey
*Assistant Examiner*—Luis Gonzalez
(74) *Attorney, Agent, or Firm*—Renner, Otto, Boisselle & Sklar, LLP

(57) ABSTRACT

A sheet transporting device including: a sheet feeding section that feeds plural sheets to a transporting path; three or more roller pairs that are arranged along the transporting path; a double feed detecting section that detects a length of a double feed portion when sheets are fed in an overlapped manner; a selecting section that selects two of the three or more roller pairs based on the length of the double feed portion; and a transport control section that can change a transporting speed of at least one of the selected roller pairs, wherein the selecting section selects two roller pairs that have a space between which the double feed portion can be positioned, and the transport control section controls the transporting speeds of the selected roller pairs such that the speeds differ from each other to separate the delaying sheet from the preceding sheet.

9 Claims, 15 Drawing Sheets

Separating 32b from 31b

Fig.4  0 < L3 < L11
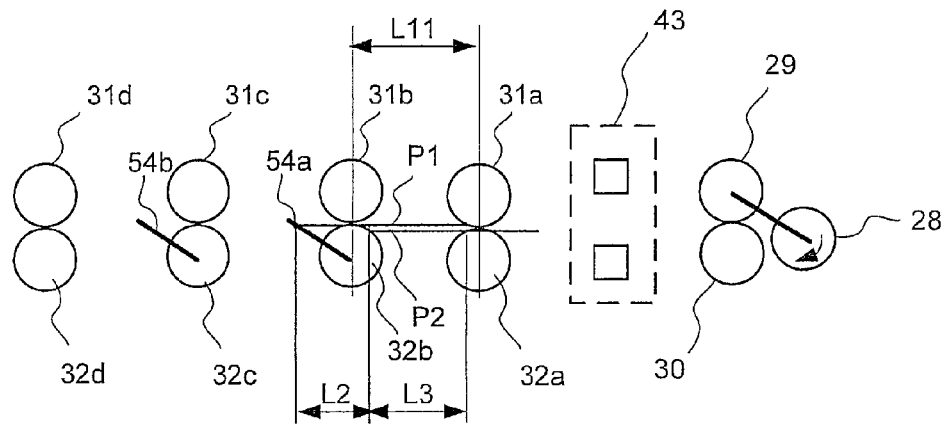
L11: Lateral length of B5 (182 mm) − 20 mm
L12: Lateral length of A4 (210 mm) − 20 mm
L13: Longitudinal length of A3 (420 mm) − 20 mm
Fig.5  L12 > L3 >= L11
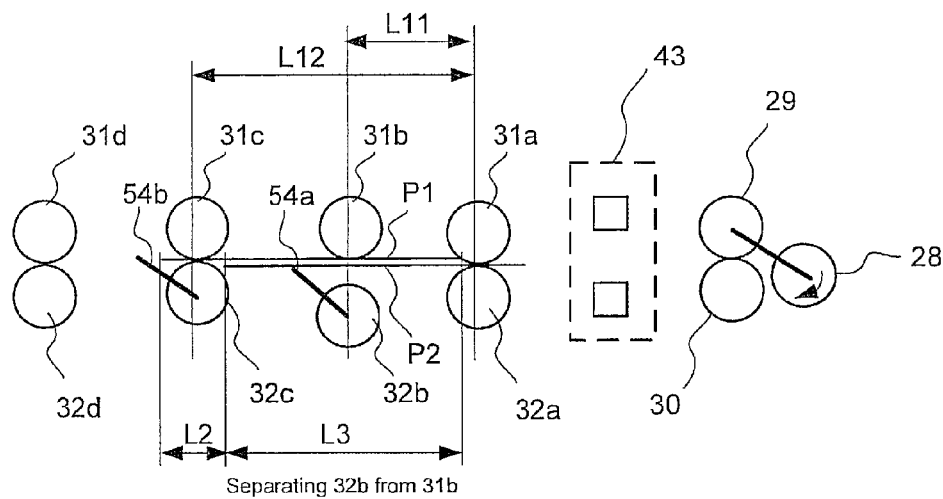
Separating 32b from 31b
Fig.6  L13 > L3 >= L12
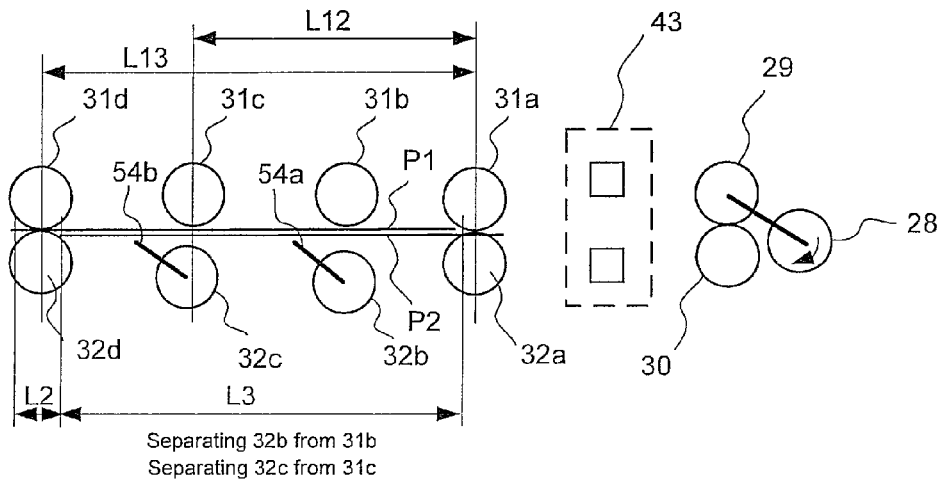
Separating 32b from 31b
Separating 32c from 31c Resetting Tc1 when leading
end of sheet passes Resetting Tc2 when leading end
of double feed portion passes Calculating L2 from value of Tc1
L2 = Tc1 x transporting speed Resetting Tc3 when leading end
of double feed portion passes Calculating L3 from value of Tc2
L3 = Tc2 x transporting speed Waiting until value of Tc1 reaches time for moving distance L4x
x is a value corresponding to separating roller 31x selected according to the length of L3

Waiting until value of Tc3 reaches time for moving distance L5

Fig. 11
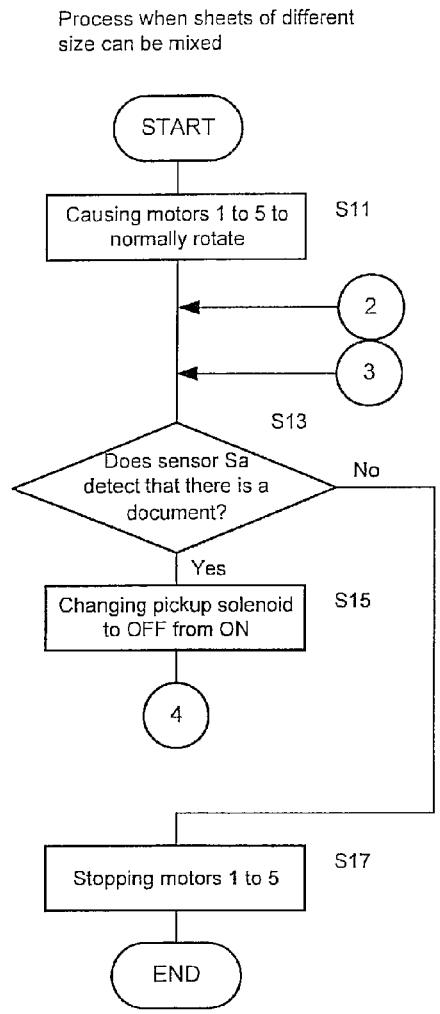
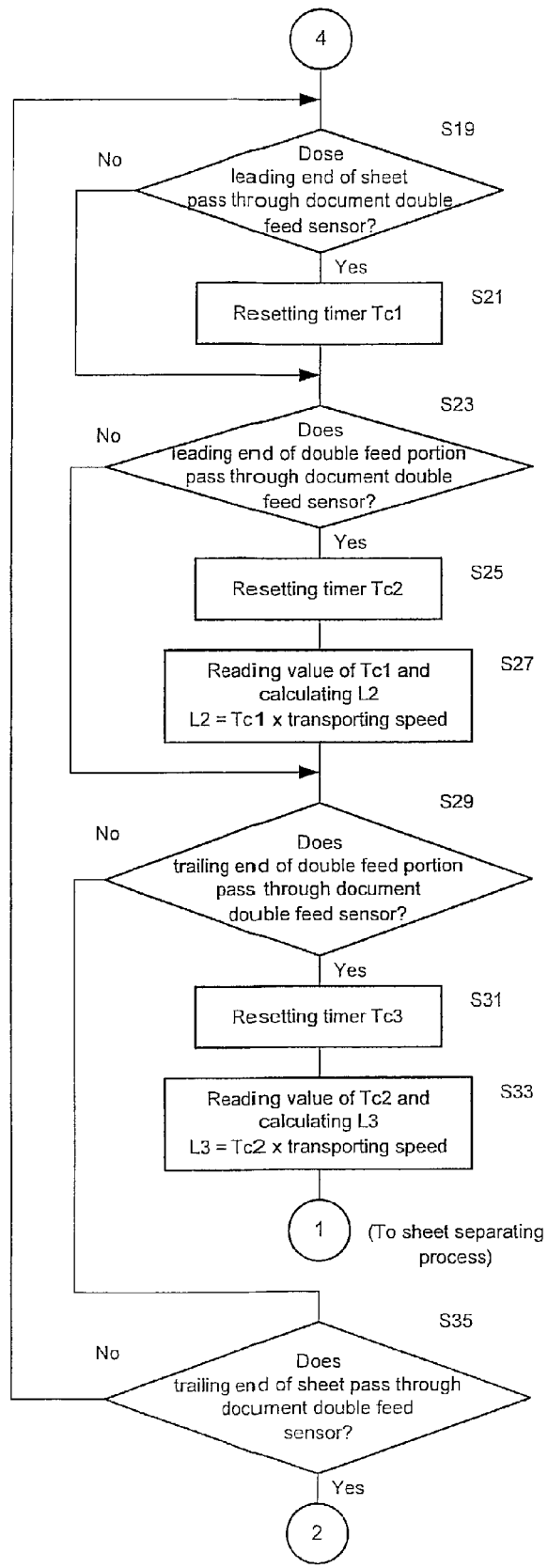

Note: Destination from No. 7 in Fig. 17 is No. 2 in Fig. 16.

Note: Destination from No. 8 in Fig. 17 is No. 2 in Fig. 16.

SHEET TRANSPORTING DEVICE, AND AUTOMATIC DOCUMENT FEEDER AND IMAGE FORMING APPARATUS PROVIDED WITH THE SAME

CROSS-REFERENCE TO RELATED APPLICATION

This application is related to Japanese application No. 2007-016650 filed on Jan. 26, 2007 whose priority is claimed under 35 USC §119, the disclosure of which is incorporated by reference in its entirety.

BACKGROUND OF THE INVENTION

1. Field of the Invention

The present invention relates to a sheet transporting device, an automatic document feeder provided with the sheet transporting device, and an image forming apparatus provided with the sheet transporting device.

2. Description of the Related Art

There has been known a sheet transporting device that feeds and transports a sheet one by one from plural sheets set and stacked at a predetermined position. The sheet transporting device described above is used, for example, in an automatic document feeder mounted to a digital multi-function peripheral or a scanner. Alternatively, the sheet transporting device described above is used at a sheet feeding section for feeding a printing sheet in a digital multi-function peripheral or an image forming apparatus including a printer. The sheet transporting device of this type includes a mechanism for separately feeding sheets one by one in a feeding section. However, a so-called double document feed phenomenon infrequently occurs, in which two or more sheets are fed in an overlapped state (double feed).

If a double feed occurs in the automatic document feeder, original images of a read document are not arranged in a correct order, so that the original images of the read document should be re-read from the start. Otherwise, a user who is not aware of the double feed later recognizes that some of the original images of the document are missing. In the worst case, the original documents are not available at that time.

When a double feed occurs in a sheet feeding section of an image forming apparatus, the double feed is detected as a paper jamming, so that the apparatus is stopped. Otherwise, an image in one page might be printed over plural sheets.

The double feed of sheets hinders the reliable and efficient document reading processing or image forming processing. Therefore, it is desirable to improve a document feeding mechanism to prevent the double feed. However, there are various types of sheets to be fed under different conditions, making it difficult to completely eliminate the double feed.

On the assumption that the occurrence of the double feed are inevitable, there has been proposed a device having a mechanism that is provided with a sensor (double feed sensor) for detecting the double feed of a sheet and separates the double-fed sheet without bothering a user. For example, there has been proposed a device that separates the double-fed sheets according to a difference in speed between a pair of upstream rollers and a pair of downstream rollers, when detecting the double feed (refer to, for example, Japanese Unexamined Patent Application Publication No. 2006-44906). There has also been proposed a device that returns a sheet toward an upstream side of a transporting path and re-feeds the sheet, when detecting the double feed (refer to, for example, Japanese Unexamined Patent Application Publication No. 2003-72988).

As described above, devices for separating double-fed sheets with various techniques have been proposed. However, it is unfavorable that the sheet is damaged due to the application of undue force to the sheet, when the double-fed sheets are separated. When a document is a subject to be transported, in particular, there is no substitute for this document, if the document sheet is damaged. A surface of a printing sheet might be roughened upon separating the sheets, which adversely affects the printing. Therefore, a technique capable of separating the double-fed sheets without giving damages thereto has been demanded.

On the other hand, it is necessary to surely separate the double-fed sheets. As described above, a mechanism for separating sheets one by one is generally provided at a sheet feeding section. However, since a surface of the double-fed sheet is extremely smooth or likely to be charged with static electricity, it is considered that the double-fed sheets are difficult to be separated in most cases. Therefore, a technique for surely separating the double-fed sheets has been demanded.

It is undesirable to take extra time for separating sheets. In particular, an efficient process is strongly desired in a so-called high-speed machine. Therefore, a technique for separating the double-fed sheets without taking extra time as much as possible has been demanded.

SUMMARY OF THE INVENTION

The present invention is accomplished in view of the foregoing circumstance, and aims to provide a sheet transporting device that can surely separate double-fed sheets without giving damages as much as possible. The present invention also provides a sheet transporting device that can separate double-fed sheets without taking extra processing time.

The present invention provides a sheet transporting device including: a sheet feeding section that feeds plural sheets one by one to a transporting path; three or more roller pairs that are arranged at predetermined positions along the transporting path and that nip and transport a sheet; a double feed detecting section that detects a length of a double feed portion, which is an overlapped portion, when sheets are fed in such a manner that another sheet (a delaying sheet) is overlapped with one sheet (a preceding sheet); a selecting section that selects two of the three or more roller pairs based on the length of the double feed portion; and a transport control section that can change a transporting speed of at least one of the selected roller pairs, wherein the selecting section selects two roller pairs that have a space between which the double feed portion can be positioned, and the transport control section controls the transporting speeds of the selected roller pairs such that the speeds differ from each other to separate the delaying sheet from the preceding sheet.

Further, the present invention provides an automatic document feeder provided with the sheet transporting device. Further, the present invention provides an image forming apparatus provided with the sheet transporting device.

BRIEF DESCRIPTION OF THE DRAWINGS

FIG. 4 is a first explanatory view showing a state in which sheets P1 and P2 are fed as overlapped;

FIG. 5 is a second explanatory view showing the state in which sheets P1 and P2 are fed as overlapped;

FIG. 6 is a third explanatory view showing the state in which sheets P1 and P2 are fed as overlapped;

FIG. 11 is a first flowchart showing a procedure of a sheet separating process according to the present invention;

DETAILED DESCRIPTION OF THE PREFERRED EMBODIMENTS

Figure 1:
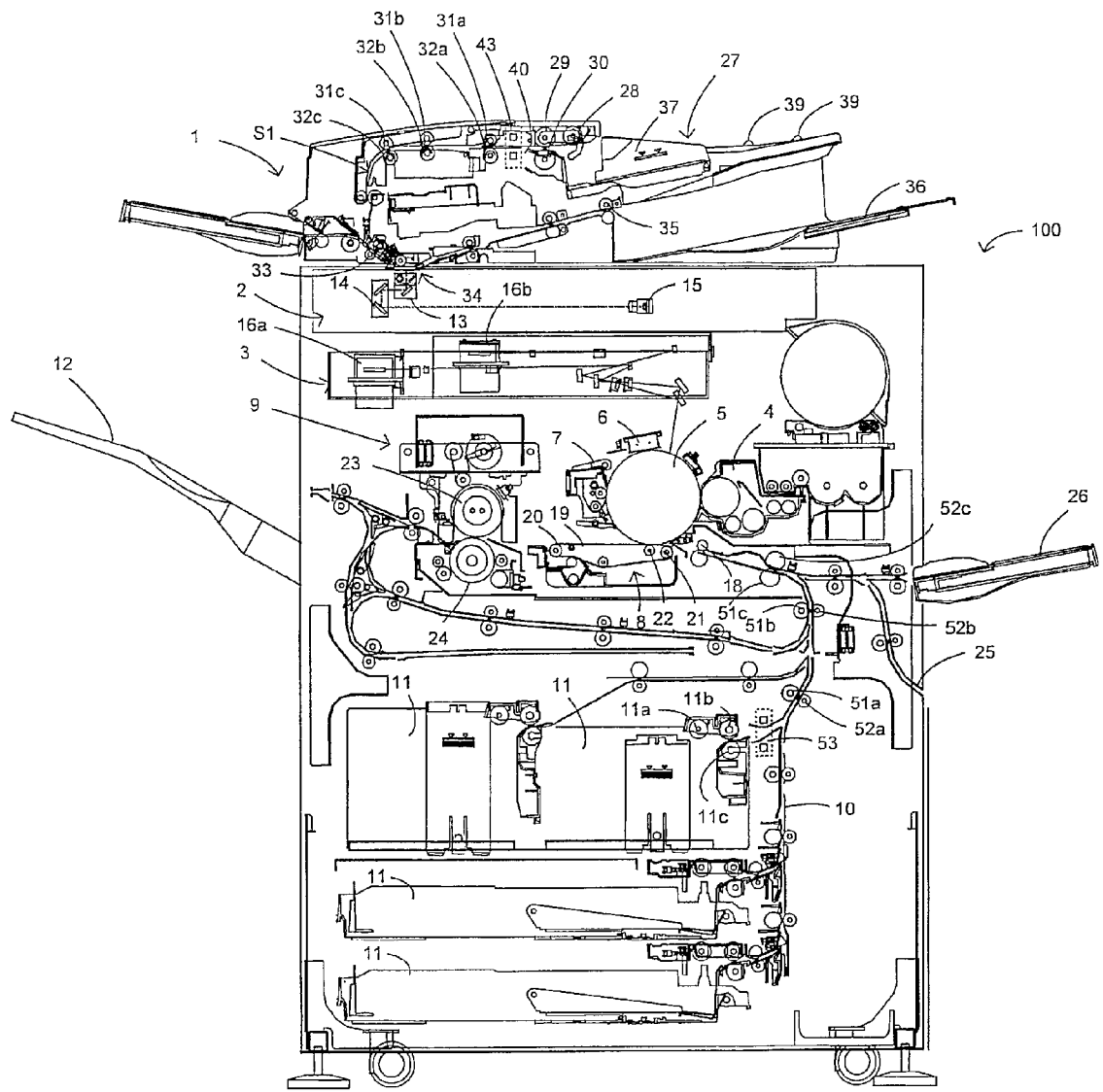
FIG. 1 is a sectional view showing an example of configurations of a digital copier to which a sheet transporting device according to the present invention is applied and an automatic document feeder (ADF) to which the sheet transporting device according to the present invention is applied.

In the sheet transporting device according to the present invention, the selecting section selects two roller pairs having the space between which the double feed portion can be positioned, and the transport control section makes the transporting speeds of the selected roller pairs different from each other in order to separate the sheet from the sheet overlapped with the sheet, whereby sheets can be separated according to the length of the double feed portion without forcibly rubbing the sheet or giving damages to the sheet. The roller pairs for transporting the sheet are arranged along the transporting path with a space such that a leading end and a trailing end of the minimum sheet, which should be transported, are brought into contact with each roller pair. According to the present invention, a sheet can be separated even if the length of the double feed portion is longer than the space between the adjacent roller pairs. Since sheets are separated as each of the roller pairs nip the sheets to be separated one by one, the sheets can more surely be separated. In order to make the transporting speeds of the roller pairs of the different, only the upstream roller pair may be decelerated or stopped and the downstream roller pair may keep its transporting speed to transport the sheet at a downstream side, whereby it is unnecessary to decrease the transporting speed of the sheet for the separation. Therefore, the double-fed sheets can be separated without taking extra processing time.

It is when the length of the double feed portion is shorter than the space between the upstream roller pair and the downstream roller pair that the double-fed sheets are separated according to the difference in the speed between the roller pairs. However, usually, a mechanism for separating sheets one by one is provided at a sheet feeding section, so that the double feed in which the sheets are perfectly overlapped with each other is infrequent. Unless the double feed in which the sheets are perfectly overlapped with each other is infrequent, it can be said that the separating mechanism does not function.

Preferable embodiments of the present invention will be explained.

In the sheet transporting device of the present invention, the selecting section may select two roller pairs such that one or more roller pair(s) are positioned between the selected two roller pairs, the roller pair(s) positioned between the selected two roller being switched between a transporting state for transporting a sheet and a free state in which the sheet can freely move, and the transport control section may change a state of the roller pair(s) positioned between the selected roller pairs into the free state for separating the sheets. By virtue of this configuration, two roller pairs via one or more roller pair are selected, and the roller pair positioned between both roller pairs make the sheet free, whereby even if the length of the double feed portion is longer than the space between the adjacent roller pairs, the sheets can be separated. Accordingly, sheets can be separated without forcibly rubbing the sheet or giving damages to the sheet.

The sheet transporting device may further include a driving section that drives and causes each roller pair to transport a sheet; and a drive switching section that switches a drive between a state in which the roller pair(s) is driven and a state in which the roller pair(s) is not driven; wherein the transport control section can bring the roller pair(s) into the free state by causing the drive switching section to switch the drive into the state in which the roller pair(s) is not driven.

Alternatively, the roller pair(s) positioned between the selected two roller pairs may include a separating/contacting mechanism for separating and contacting the rollers constituting the roller pair(s) from each other, and the transport control section may bring the roller pair(s) into the free state by separating the rollers from each other Further, the transport control section may delay the transportation of the delaying sheet overlapped with the preceding sheet by decelerating or stopping an upstream roller pair of the selected roller pairs. By virtue of this configuration, the sheets can be separated without changing the transporting speed of the sheet at the downstream side of the double-fed sheets. If the sheet at the upstream side is delayed with respect to the sheet at the downstream side at a predetermined interval, and then, transported at a predetermined transporting speed, extra time is not needed to separate the sheets.

Furthermore, the sheet feeding section may include a sheet separating section for separating one sheet from stacked sheets, and the transport control section may decelerate or stop the upstream roller pair after the overlapped delaying sheet passes through the sheet separating section when the delaying sheet is fed as overlapped with a trailing end of the preceding sheet. By virtue of this configuration, a state in which a part of the sheet keeps in contact with the separating section for a long period can be avoided. The separating section may rub the sheet or warp the sheet depending upon its structure. This invention is preferable from this viewpoint.

Further, the sheet transporting device may further include: a registration roller that is arranged at a downstream side from a downstream roller pair, and feeds a sheet at a predetermined timing after temporarily stopping a leading end of the transported sheet at a predetermined position, wherein the transport control section may decelerate or stop the upstream roller pair before the delaying sheet overlapped with the preceding sheet reaches the registration roller. The registration roller is for sending the sheet in synchronism with a predetermined timing for the reading or image processing. When the upstream roller pair is decelerated or stopped during the operation for sending the sheet, the operation for sending the sheet becomes unstable. Therefore, it is preferable that the upstream roller pair is decelerated or stopped at the position before the sheet reaches the registration roller.

Further, the sheet transporting device may further includes: a size acquiring section for acquiring a size of the stacked sheets before the feeding, wherein the double feed detecting section may further detect a length from a leading end of the preceding sheet to a leading end of the double feed portion, and the transport control section may calculate a difference between a length of the acquired size in the transporting direction and the length from the leading end of the preceding sheet to the leading end of the double feed portion and may define the difference as the length of the double feed portion. By virtue of this configuration, the length of the double feed portion can be obtained at the point when the leading end of the double feed portion passes through the double feed detecting section. As a result, when the sheet is returned to the sheet feeding section and re-fed, the sheet is returned at the point earlier than the point when the trailing end of the double feed portion reaches the double feed detecting section, whereby the sheet can be re-fed in a shorter period.

Various preferable embodiments described here can be combined.

The present invention will be described in detail with reference to the drawings. It should be understood that the following description is illustrative of the invention in all aspects, but not limitative of the invention.

(Example of Configuration of Sheet Transporting Device)

FIG. 1 is a sectional view showing an example of configurations of an image forming apparatus to which a sheet transporting device according to the present invention is applied and an automatic document feeder (ADF) to which the sheet transporting device according to the present invention is applied. The image forming apparatus in FIG. 1 is an electrophotographic digital copier.

Overall Configuration and Operation of Copier

Firstly, an overall configuration and its operation of a digital copier, which is an example to which the sheet transporting device according to the present invention is applied, will be explained.

Three or more roller pairs in the sheet transporting device according to the present invention are provided respectively at a transporting path for transporting a document and a transporting path for transporting a printing sheet.

Arranged at a document transporting path are a first roller pair composed of rollers 31a and 32a, a second roller pair composed of rollers 31b and 32b, and a third roller pair composed of 31c and 32c. These three roller pairs are controlled, whereby a double-fed document can be separated. The double-feed detecting section of the present invention corresponds to a sensor identified by a reference numeral 43. Arranged at the transporting path for a printing sheet are a first roller pairs composed of rollers 51a and 52a, a second roller pair composed of rollers 51b and 52b, and a third roller pair composed of rollers 51c and 52c. These three roller pairs are controlled, whereby a double-fed printing sheet can be separated. A double-feed detecting section corresponds to a sensor identified by a reference numeral 53.

As described bellow, is controlled by an ADF control section not shown in FIG. 1. The ADF control section corresponds to the selecting section and the transport control section of the present invention.

The embodiment will be explained below with reference to the drawings. In FIG. 1, a sheet fed from a sheet feeding tray 11 of a copier 100 passes through a sheet transporting path 10 to reach a transferring section to which a transfer unit 8 is arranged. The sheet transporting device according to the present invention is applied in the sheet transporting path 10. An image reading section 2 for reading an image of a document is arranged at an upper part of the main body of the copier 100. An ADF 1 is mounted above the image reading section 2. The ADF 1 feeds the document placed onto an original tray 27 so as to transport the same to a document reading section 34 of the image reading section 2. The sheet transporting device according to the present invention is applied in a document transporting path S1 through which the document reaches the document reading section 34. The copier 100 scans the document (sheet) transported by the ADF 1 to obtain image data, and forms the image according to the obtained image data or image data externally transmitted onto the sheet fed from the sheet feeding section of the sheet feeding tray 11 or the like.

The image forming apparatus 100 is mainly composed of the ADF 1, the image reading section 2, an optical writing unit 3, a developing unit 4, a photoconductor 5, a charging device 6, a cleaner unit 7, a transfer unit 8, a fuser unit 9, the sheet transporting path 10, the sheet feeding tray 11 and a sheet exit tray 12.

The image reading section (reading device) 2 is mainly composed of a light source holder 13, a mirror group 14, and a CCD 15. When the document conveyed from the ADF 1 is scanned, a later-described control section scans the image of the document with the light source holder 13 and the mirror group 14 stood still at a predetermined position (document reading section 34). Specifically, light is irradiated to the document from the light source holder 13 in accordance with the document transported from the ADF 1. Some of the irradiated lights are reflected from the document surface to be focused on the CCD 15 through the mirror group 14. The output signal from the CCD 15 is processed to be converted into digital data, whereby image data according to the image of the document can be obtained. Thus, the image of the document is read. The specific configuration and operation of the ADF 1 will be described later.

The charging device 6 is charging means for uniformly charging a surface of the photoconductor 5 at a predetermined potential. Although the image forming apparatus 100 in FIG. 1 employs a charger-type charging device 6, a contact-type charging device, such as a roller-type charger or brush-type charger, can be employed.

In the present embodiment, a laser scanning unit (LSU) provided with a laser irradiating sections 16a and 16b and mirror groups 17a and 17b is used as the optical writing unit 3. However, instead of this, an LED writing head having light-emitting devices arranged in an array can be used. The optical writing unit 3 employs a two-beam system provided with two laser irradiating sections 16a and 16b in order to cope with high-speed printing process. Thus, the optical writing unit 3 copes with high-speed writing. The optical writing unit 3 irradiates laser scanning beam, which is modulated in accordance with the inputted image data, from the laser irradiation sections 16a and 16b. The irradiated laser beam reaches the photoconductor 5 through the mirror groups, thereby exposing the uniformly charged photoconductor 5.

Thus, an electrostatic latent image corresponding to the image data is formed on the surface of the photoconductor 5.

The developing unit 4 is arranged in the vicinity of the photoconductor 5. The developing unit 4 makes the electrostatic latent image formed on the surface of the photoconductor 5 visible (development) with black toner. The cleaner unit 7 is arranged around the photoconductor 5. The cleaner unit 7 removes and collects residual toners on the surface of the photoconductor 5 after the development and image transfer.

The copier 100 has a control section, not shown, for integrally controlling the overall device. The control section includes a main CPU, ROM, RAM, non-volatile memory, input circuit, driver circuit, output circuit, communication circuit and the like. The ROM stores a control program executed by the main CPU. The RAM provides a work area to the main CPU. The non-volatile memory holds data used for the control. The input circuit is a circuit to which signals from the detecting means at the respective sections of the copier 100 are inputted. The driver circuit drives a load such as an actuator or motor for operating each of the driving mechanisms in the copier 100. The output circuit outputs a control signal to the subject to be controlled such as the laser irradiation sections 16a and 16b. The communication circuit makes communication with a later-described ADF control section of the ADF 1. The main CPU can execute processing with the use of the signals inputted to the input circuit. Further, the main CPU can drive each load through the driver circuit. The main CPU can further output a control signal to the subject to be controlled through the output circuit. The main CPU can also receive or send information or commands, necessary for the control, from or to the ADF control section of the ADF 1 through the communication circuit.

The transfer unit 8 applies a voltage having a polarity reverse to the polarity of the electrostatic latent image to an elastic conductive roller 22 in the unit for transferring a toner on the surface of the photoconductor 5 onto a recording sheet. For example, when the electrostatic latent image has charges of a negative (−) polarity, the polarity of the voltage applied to the elastic conductive roller 22 becomes positive (+). A transfer belt 19 is stretched in the transfer unit 8 by a drive roller 20, driven roller 21 and other rollers, and has a predetermined resistance value (e.g., within the range of $1 \times 10^9$ to $1 \times 10^{13}$ Ω·cm). The elastic conductive roller 22 is arranged at the contact portion of the photoconductor 5 and the transfer belt 19.

The recording sheet on which the toner is transferred is transported to the fuser unit 9. The fuser unit 9 fuses the toner to be fixed onto the recording sheet. The fuser unit 9 has a heat roller 23 and a pressure roller 24. A heat source for heating a surface of the heat roller 23 to a predetermined temperature (fusing temperature: approximately 160 to 200° C.) is arranged at the inner peripheral portion of the heat roller 23. On the other hand, unillustrated pressure members are arranged at both ends of the pressure roller 24 such that the pressure roller 24 comes in pressed contact with the heat roller 23 with a predetermined pressure. Accordingly, the toner is heated to be fused at the press-contact portion (referred to as fusing nip portion) between the heat roller 23 and the pressure roller 24. The fused toner is pressed against the recording sheet to remain fixed on its surface.

Plural sheet feeding trays 11 are for accumulating recording sheets. In the copier 100 in the embodiment, the sheet feeding trays 11 are mounted at a lower part of the main body. The copier 100 in the embodiment is a so-called high-speed machine. Therefore, each of the sheet feeding trays 11 is designed so as to be capable of storing a great number of sheets. Each of the sheet feeding trays 11 can store 500 to 1500 recording sheets of a standard size. Arranged at the sheet feeding tray 11 are a pickup roller 11a, sheet feeding roller 11b and separation roller 11c. The pickup roller 11a sends a sheet one by one from a stack of sheets placed onto the sheet feeding tray 11 to the sheet transporting path 10. A pair of the sheet feeding roller 11b and the separation roller 11c transports the sheet to a downstream side of the sheet transporting path 10 while separating the sheet sent to the sheet transporting path 10 by the pickup roller 11a. Each of the sheet feeding trays 11 and the pickup roller 11a corresponds to the sheet feeding section of the present invention. The pair of the sheet feeding roller 11b and the separation roller 11c is a sheet separating section of the present invention.

A double feed sensor (double feed detecting section) for detecting the double feed of the fed sheet, and plural pairs of transporting roller 51 and driven roller 52 (different alphabets a, b, and c are appended at the end of the symbol of each pair) are arranged at the sheet transporting path 10 through which the sheet fed from the sheet feeding tray 11 passes. Plural pairs of the transporting roller 51 and the driven roller 52 are provided along the sheet transporting path 10 for transporting the sheet sent to the sheet transporting path 10 to the transfer section. A registration roller 18 stops the sheet passing through the sheet transporting path 10 at a predetermined position by bringing a leading end of the sheet in contact thereto, and then, transports the sheet to the transfer section at a predetermined timing.

A double feed sensor 53 is provided at the downstream side of the pair of the sheet feeding roller 11b and the separation roller 11c. The double feed sensor 53 is composed of a transmitter 53a that transmits ultrasonic wave, and a receiver 53b that receives the ultrasonic wave transmitted from the transmitter 53a through the sheet transporting path 10. The degree of the attenuation of the ultrasonic wave from the transmitter 53a to the receiver 53b varies according to the presence or absence of the sheet passing through the double feed detecting section and the presence or absence of the double feed of the passing sheet. By using this property, the presence or absence of the double feed of the document passing through the double feed sensor 53 and the passing time of the double feed portion are detected. The length of the double feed portion in the transporting direction is obtained from the detected passing time of the double feed portion and the predetermined document transporting speed.

A transporting path 25 to which a large-capacity cassette capable of storing a greater number of sheets is attached and a manual sheet feeding tray 26 for feeding mainly a sheet of a non-standard size are mounted to a side face of the main body of the copier 100.

The sheet exit tray 12 is arranged at the side face of the main body opposite to the manual sheet feeding tray 26. The copier 100 has a configuration in which a finisher for performing a post-processing of the discharged sheet (stapling, punching, etc.) or a multi-bin sheet exit tray can be arranged as an option instead of the sheet exit tray 12.

Configuration and Operation of Sheet Transporting Device

The configuration of the sheet transporting device will be explained, taking as an example the portion of the above-mentioned digital copier 100, where the sheet transporting device according to the present invention is applied to the ADF 1. FIG. 1 is a schematic view showing the configuration of the ADF 1 to which the sheet transporting device of the present invention is applied. As shown in FIG. 1, the sheet transporting device according to the present invention is mainly composed of a document tray 27 serving as a sheet feeding section, document pickup roller 28, document feeding roller 29, document separation roller 30, plural pairs of a document transporting roller 31 and a driven roller 32 (different alphabets a, b, and c are appended at the end of the symbol of each pair), document registration roller 33, document exit roller 35, and document exit tray 36. The ADF 1 further includes a document length sensor 39, transport length sensor 40 and document double feed sensor 43.

Among these components, the document tray 27 and the document pick-up roller 28 corresponds to the sheet feeding section of the present invention.

The plural pairs of document transport rollers 31a, 31b and 31c and the driven rollers 32a, 32b and 32c correspond to the roller pair of the present invention. The first roller pair is composed of the rollers 31a and 32a, the second roller pair is composed of the rollers 31b and 32b, and the third roller pair is composed of the rollers 31c and 32c.

The document double-feed sensor 43 corresponds to the double-feed detecting section of the present invention.

The document feeding roller 29 and the document separation roller 30 correspond to the sheet separating section of the present invention.

The ADF 1 includes an ADF control section not shown. The ADF control section corresponds to the selecting section and the transport control section of the present invention.

The ADF control section is composed of a sub-CPU, ROM, RAM, non-volatile memory, input circuit, driver circuit, output circuit, communication circuit and the like. The ROM stores a control program executed by the sub-CPU. The RAM provides a work area to the sub-CPU. The non-volatile memory holds data used for the control. The input circuit is a circuit to which signals from the detecting means for each section of the ADF 1 are inputted. The driver circuit drives a load such as an actuator or motor for operating the driving mechanism for each section of the ADF 1. The output circuit outputs control signals to the subject to be controlled such as the transmitter 43a of the document double feed sensor 43. The communication circuit makes a communication with the control section of the main body of the copier 100. The sub-CPU can execute processing with the use of the signals inputted to the input circuit. The sub-CPU can also drive each load through the driver circuit. The sub-CPU can also output control signals to the subject to be controlled through the output circuit.

The document tray 27 is a tray for a user to place a document stack thereon. The document pickup roller 28 sends the document one by one to the document transporting path S1 from the document stack placed onto the document tray 27. A pair of the document feeding roller 29 and the document separation roller 30 transports the document to a downstream side of the document transporting path S1 while separating the document sent to the document transporting path S1 by the document pickup roller 28. Plural pairs of the document transporting roller 31 and the driven roller 32 are provided along the document transporting path S1 for transporting the document sent to the document transporting path S1 to the document reading section 34. The document registration roller 33 is stopped when the leading end of the document passing through the document transporting path S1 reaches the position of the document registration roller 30, and the document registration roller 30 brings the leading end of the document into contact thereto so as to stop the document at a predetermined position. Then, the document registration roller 30 transports the document to the document reading section 34 at a predetermined timing. The document exit roller 35 exits the document, which has been subject to the image-reading at the image reading section 34, to the document exit tray 36.

A pair of movable regulation plates 37 and plural document length sensors 39 is provided at the document tray 27. A pair of movable regulation plates 37 is used by a user in such a manner that the user moves a pair of movable regulation plates 37 to the position according to the width of the document so as to align the width of the placed document stack in a main scanning direction (a direction orthogonal to the transporting direction). The regulation plates 37 function as a sensor of a document size in a widthwise direction since the position thereof is matched to the width of the document. The document length sensor 39 is composed of plural sensors, each of which is arranged along a transporting direction of the document. Each sensor has a movable cantilever section, wherein a part of the cantilever section protrudes over the document tray 27 with the document not placed. When the document is placed onto the document tray 27, the leading end of the cantilever section at the area covered by the document is lowered below a surface of the tray. Each sensor changes the signal in response to the displacement of the cantilever. The length of the document in the transporting direction is detected from the combination of the signals of the document length sensors 39 provided at each portion. The ADF control section specifies one standard size, among plural standard sizes, in accordance with the result of the detection of the document width by the regulation plates 37 and the result of the detection of the document length by the document length sensors 39, so as to obtain the size of the document on the document tray 27.

The transport length sensor 40 provided with a cantilever that displaces due to the contact to the fed document is disposed between the document pickup roller 28 and the document separation roller 30. The cantilever of the transport length sensor 40 rises when the leading end of the document passes, while it returns to the original position when a trailing end of the document passes. Therefore, the document passing time taken from when the cantilever rises to when the cantilever returns to the original position is counted, wherein the length of each of the fed documents in the transporting direction is obtained from the counted passing time and the predetermined document transporting speed. Thus, the length of each document can be obtained even if documents each having a different size in the transporting direction are mixedly placed.

The document double feed sensor 43 is mounted between the pair of the document feeding roller 29 and the document separation roller 30 and the pair of the document transporting roller 31 and the driven roller 32. The document double feed sensor 43 is composed of a transmitter 43a that transmits ultrasonic wave, and a receiver 43b that receives the ultrasonic wave transmitted from the transmitter 43a through the document transporting path S1. The degree of the attenuation of the ultrasonic wave from the transmitter 43a to the receiver 43b varies according to the presence or absence of the document passing through the double feed detecting section and the presence or absence of the double feed of the passing document. By using this property, the presence or absence of the double feed of the document passing through the double feed sensor 43 and the passing time of the double feed portion are detected. The length of the double feed portion in the transporting direction is obtained from the detected passing time of the double feed portion and the predetermined document transporting speed. The document double feed sensor 43 corresponds to the double feed detecting section of the present invention.

Detection of Double Feed and Separation of Sheet

The operation of a sheet separating process, which is the feature of the present invention, will be described in detail below. The sheet separating device of the ADF 1 is taken as an example in the following explanation. The sheet separating operation is controlled by the above-mentioned ADF control section. The sheet separating device at the main body of the image forming apparatus 100 also has a similar structure. A person skilled in the art would easily apply this description to the sheet separating device at the main body of the image forming apparatus 100.

Figure 2A:
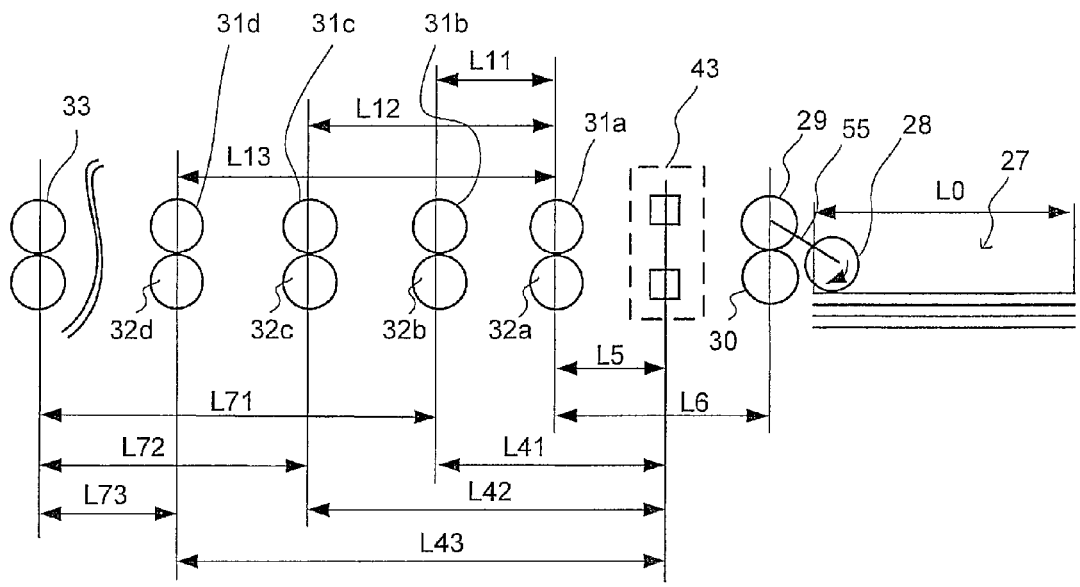
FIGS. 2A and 2B are schematic views showing a schematic configuration of an ADF (automatic document feeder) according to the sheet transporting device of the present invention.
Figure 2B:
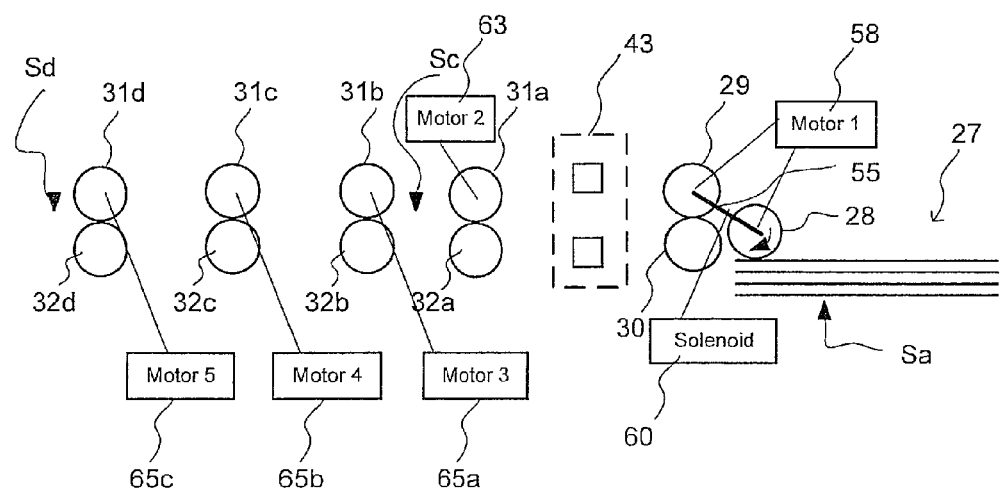

FIGS. 2A and 2B are explanatory views schematically showing the components arranged in the transporting path from the document tray 27 to the document registration roller 33, and their arrangement relationship from the document tray 27 to the document registration roller 33. FIG. 2A shows the arrangement of the rollers and document double feed sensor 43 in the transporting path. In FIG. 2A, a document having a length L0 in the transporting direction is placed onto the document tray 27 at a right end. The document is transported from a right side to a left side in FIG. 2A. Arranged in the document transporting path are the document pickup roller 28, a pair of the document transporting roller 29 and the document separation roller 30, the document double feed sensor 43, roller pair composed of the document transporting roller 31a and the driven roller 32a, roller pair composed of the document transporting roller 31b and the driven roller 32b, roller pair composed of the document transporting roller 31c and the driven roller 32c, roller pair composed of the document transporting roller 31d and the driven roller 32d, and the document registration roller 33, in this order from the upstream side of the transporting path. FIG. 1 shows the embodiment having three roller pairs, while FIG. 2 shows the more popular embodiment having four roller pairs. It is easy to understand the embodiment having three roller pairs or the embodiment having five or more roller pairs from FIG. 2.

The components mainly constituting the characteristic portion of the sheet separating device of the present invention are the document double feed sensor 43, and four roller pairs of the document transporting rollers 31a, 31b, 31c and 31d and the driven rollers 32a, 32b, 32c and 32d. The distance from the document feeding roller 29 to the document transporting roller 31a (upstream-end transporting roller) at a downstream side of the document feeding roller 29 is L6. The distance from the document double feed sensor 43 arranged at the downstream side of the document feeding roller 29 to the document transporting roller 31a at a downstream side of the document double feed sensor 43 is L5. The distance from the document transporting roller 31a to the document transporting roller 31b at a downstream side of the document transporting roller 31a is L11, the distance from the document transporting roller 31a to the document transporting roller 31c is L12, and the distance from the document transporting roller 31a to the document transporting roller 31d is L13. The distance from the document double feed sensor 43 to the document transporting roller 31b at the downstream side of the document double feed sensor 43 is L41, the distance from the document double feed sensor 43 to the document transporting roller 31c is L42, and the distance from the document double feed sensor 43 to the document transporting roller 31d is L43. The distance from the document registration roller 33 to the document transporting roller 31b at an upstream side of the document registration roller 33 is L71, the distance from the document registration roller 33 to the document transporting roller 31c is L72, and the distance from the document registration roller 33 to the document transporting roller 31d is L73.

One preferable example of the sizes is as described below. Specifically, L11 is set to the size with 182 mm, which is the length of B5-size sheet in the lateral feeding direction, defined as the reference. L12 is set to the size with 210 mm, which is the length of A4-size sheet in a lateral feeding direction, defined as the reference. L13 is set to the size with 420 mm, which is the length of A3-size sheet in a longitudinal feeding direction, defined as the reference. For example, each distance is set to the size shorter than each reference by 20 mm, i.e., L11 is set to 162 mm, L12 is set to 190 mm, and L13 is set to 400 mm.

FIG. 2B schematically shows the arrangement of driving sources for driving each roller in FIG. 2A. The document feeding roller 29, the document pickup roller 28 and the document separation roller 30 are driven by a first motor (motor 1) 58. The document transporting roller 31a is driven by a second motor (motor 2) 63. The document transporting roller 31b is driven by a third motor (motor 3) 65a. The document transporting roller 31c is driven by a fourth motor (motor 4) 65b, and the document transporting roller 31d is driven by a fifth motor (motor 5) 65d.

The document pickup roller 28 is mounted to a leading end of a pickup arm 55 biased upwardly by a spring. The pickup arm 55 is engaged with a movable section of a pickup solenoid (solenoid 1) 60 that descends the document pickup roller 28 by the energization. The biasing causes the document pickup roller 28 apart from the document other than the feeding. When the ADF control section drives the pickup solenoid 60 upon feeding the document, the pickup arm 55 descends against a biasing force, whereby the document pickup roller 28 comes in contact with an uppermost sheet. The document pickup roller 28 rotates by the drive of the first motor 58 so as to send the uppermost sheet to the document feeding roller 29. The fed document is further transported to the downstream side by the document feeding roller 29, while the document separation roller 30 rotates with low speed in a direction of returning the document to the document tray 27. Therefore, the sheet, which is immediately below the uppermost sheet and is fed together with the uppermost sheet, is separated from the uppermost sheet. The separated sheet is fed as the uppermost sheet at the next feeding timing. A document sensor Sa for detecting the presence or absence of the document on the document tray 27, and sheet passage sensors Sc and Sd for detecting the passage of the leading end and trailing end of the sheet are arranged in the document transporting path.

Figure 3:
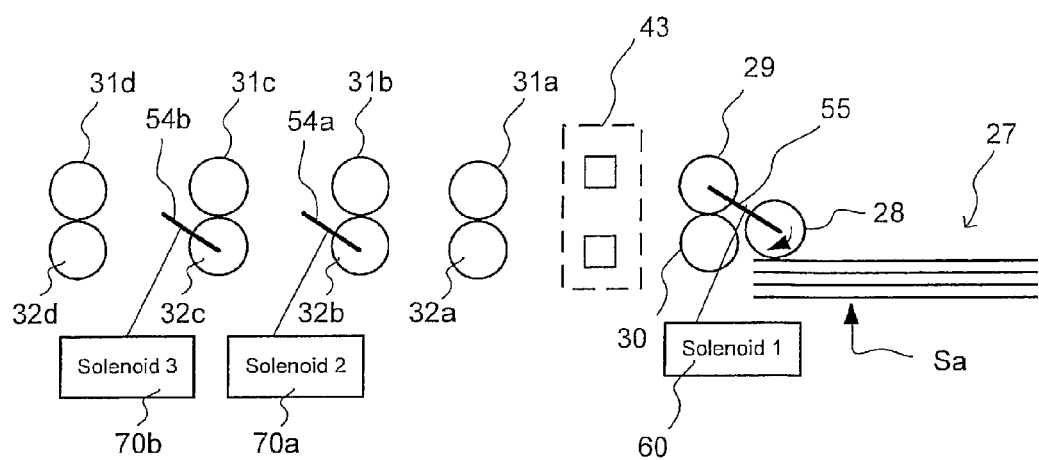
FIG. 3 is a schematic view showing a configuration in which the sheet transporting device according to the present invention has a mechanism for separating and contacting a roller pair.

When the third motor 63a and the fourth motor 65b, which are the driving sources of the document transporting rollers 31b and 31c, are deenergized, the document transporting rollers 31b and 31c may have no driving forces, so that they may freely rotate with the movement of the sheet. In this case, when each motor is deenergized by the ADF control section, a sheet can freely be moved. Alternatively, a separating/contacting mechanism may be provided. FIG. 3 is a schematic view showing the configuration in which the sheet transporting device according to the present invention includes a mechanism for separating or contacting the roller pairs. As shown in FIG. 3, the sheet transporting device has a first separating/contacting lever (separating/contacting lever A) 54a for separating and contacting the document transporting roller 31b and the driven roller 32b from and to each other, and a second separating/contacting lever (separating/contacting lever B) 54b for separating and contacting the document transporting roller 31c and the driven roller 32c from and to each other. The separating/contacting lever A biases the driven roller 32b such that the driven roller 32b is brought into pressed contact with the document transporting roller 31b.

However, when the solenoid 2 is energized, the separating/contacting lever A moves against the biasing force so as to form a gap between the document transporting roller 31b and the driven roller 32b. The separating/contacting lever B similarly forms a gap between the document transporting roller 31c and the driven roller 32c by the energization to the solenoid 3.

Figure 10A:
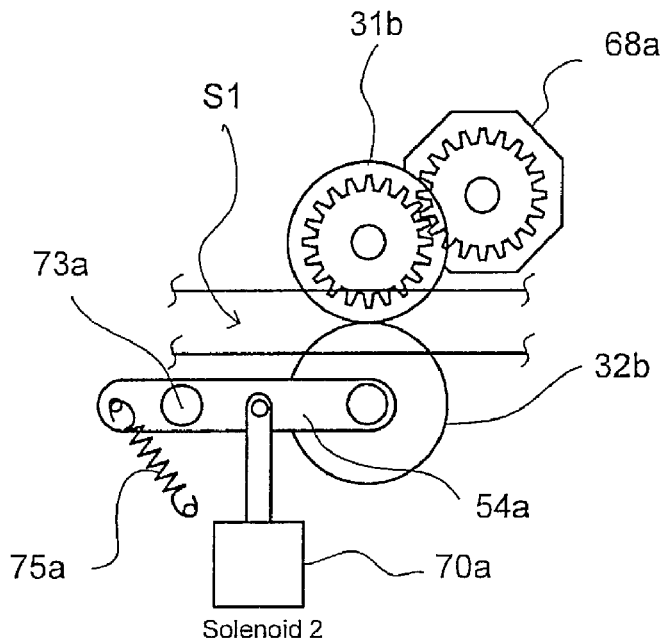
FIGS. 10A and 10B are explanatory views for showing the detail of the separating/contacting mechanism in the sheet separating device according to the present invention.
Figure 10B:
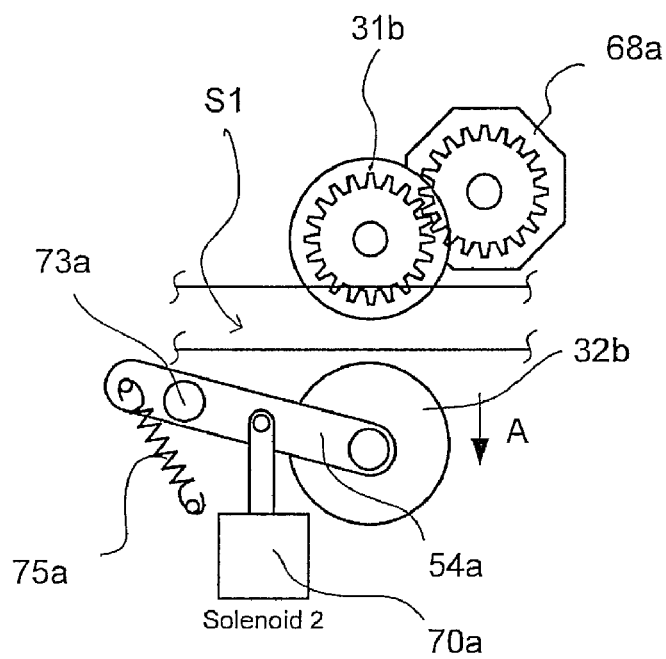

FIGS. 10A and 10B are explanatory views for explaining the detail of the separating/contacting mechanism. FIG. 10A shows a state in which the solenoid 2 is deenergized, while FIG. 10B shows the state in which the solenoid 2 is energized. In FIG. 10A, the first separating/contacting lever 54a is biased so as to rotate in a counterclockwise direction about a support 73a by an action of an extension spring 75a. Accordingly, the driven roller 32b having one end of the separating/contacting lever 54a as a rotational shaft comes in pressed contact with the document transporting roller 31b. The sheet that is being transported on the document transporting path S1 receives transportation force from the document transporting roller 31b during when the sheet passes the press-contact portion. When the solenoid 2 is energized, the separating/contacting lever 54a rotates in the clockwise direction, so that the driven roller 32b moves downward as shown in FIG. 10B. Thus, the gap is formed between the document transporting roller 31b and the driven roller 32b. The sheet that is being transported on the document transporting path S1 does not receive the transportation force from the document transporting roller 31b.

Figure 9:
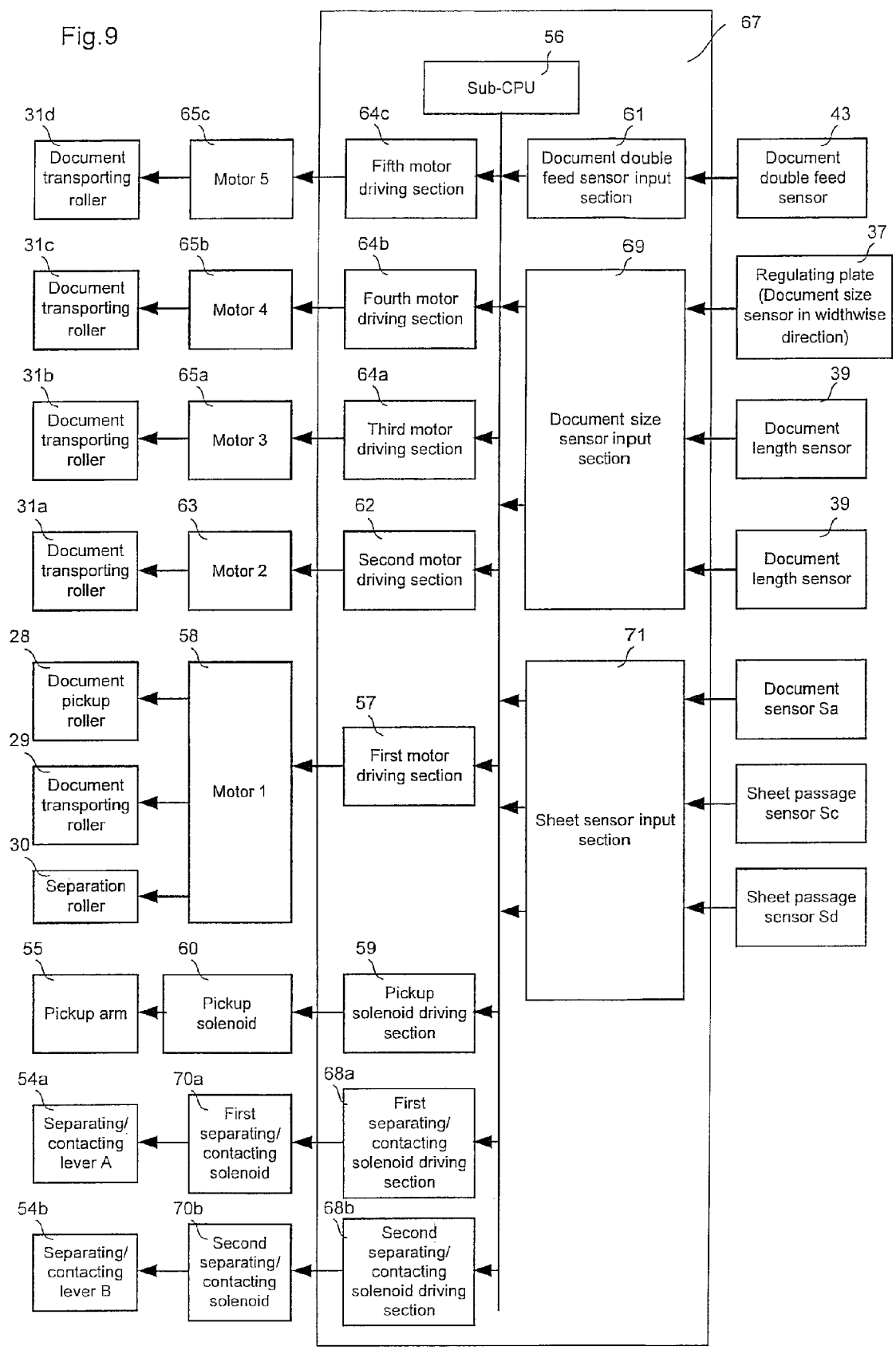
FIG. 9 is a block diagram showing a part of functional configuration of an ADF control section according to the present invention.

FIG. 9 is a block diagram showing a part of the functional configurations of the ADF control section that recognizes the detection signal of the document double feed sensor 43 for driving the motors and solenoids described above. In FIG. 9, the ADF control section 67 includes a sub-CPU 56, document double feed sensor input section 61, document size sensor input section 69, sheet sensor input section 71, first motor driving section 57, second motor driving section 62, third motor driving section 64a, fourth motor driving section 64b, fifth motor driving section 64c, pickup solenoid driving section 59, first separating/contacting solenoid driving section 68a, and second separating/contacting solenoid driving section 68b. The document double feed sensor input section 61 is an input circuit to which the detection signal from the document double feed sensor 43 is inputted.

The document size sensor input section 69 is an input circuit to which signals from the regulation plate 37 for detecting the width of the document and the document length sensor 39 for detecting the length of the document are inputted. The sheet sensor input section 71 is an input circuit to which signals from the document sensor Sa and sheet passing sensors Sc and Sd are inputted. The first motor driving section 57, the second motor driving section 62, the third motor driving section 64a, the fourth motor driving section 64b, and the fifth motor driving section 64c are driver circuits for respectively driving the first motor 58, the second motor 63, the third motor 65a, the fourth motor 65b, and the fifth motor 65c. The pickup solenoid driving section 59 is a driver circuit for driving the pickup solenoid 60. In the embodiment having the separating/contacting lever as shown in FIG. 3, the first separating/contacting solenoid driving section 68a is a driver circuit for driving the first separating/contacting solenoid (solenoid 2) 70a, and the second separating/contacting solenoid driving section 68b is a driver circuit for driving the second separating/contacting solenoid (solenoid 3) 70b.

The document separation roller 30 separates the sheet, which is fed together with the uppermost sheet, from the uppermost sheet by a friction force between the sheet and a surface of the document separation roller. However, when an attraction force between the sheets exceeds the friction force, the overlapped sheets cannot be separated, which causes double feed. FIG. 4 is an explanatory view showing the procedure for separating the double-fed sheet by the sheet separating device according to the present invention, when two sheets are fed as overlapped. The uppermost sheet P1 of the overlapped sheets is a sheet that should originally be fed. A lowermost sheet P2 is a sheet that is fed together with the uppermost sheet. The sheet P2 is fed in such a manner that the leading end thereof is delayed from the uppermost sheet by the length L2 due to the separating operation of the document separation roller 30. The length of the double feed portion is L3.

The output level of the output signal from the document double feed sensor 43 changes at the respective timings of the timing when the leading end of the sheet P1 passes through the document double feed sensor 43, the timing when a leading end of the double feed portion passes through the document double feed sensor 43, the timing when the trailing end of the double feed portion passes through the document double feed sensor 43, and the timing when the trailing end of the sheet P2 passes through the document double feed sensor 43. The ADF control section 67 recognizes each timing on the basis of the change in the level. When the ADF control section 67 recognizes that the trailing end of the double feed portion passes through the document double feed sensor 43, the ADF control section 67 calculates the length L3 of the double feed portion from the passing time of the leading end and the trailing end of the double feed portion and the sheet transporting speed.

Then, the ADF control section 67 compares the calculated length L3 and the distances L11, L12 and L13 between the document transporting roller 31a at the upstream end and the document transporting rollers 31b, 31c and 31d that are adjacent at the downstream side. The ADF control section 67 selects any one of the document transporting rollers 31b, 31c, and 31d according to the result of the comparison, except for the case in which each of the distances is equal to L3 or longer than L3.

FIG. 4 is an explanatory view showing a state in which the sheets P1 and P2 are fed as overlapped in the case of L3<L11. When L3<L11, the ADF control section 67 waits until the double feed portion is positioned between the document transporting roller 31a and the document transporting roller 31b, the sheet P1 is nipped between the document transporting roller 31b and the driven roller 32b at the downstream side, and the sheet P2 is nipped between the document transporting roller 31a and the driven roller 32a at an upstream side of the driven roller 32a. This timing is specified as the timing when the trailing end of the double feed portion is transported by the distance L5 after the trailing end of the double feed portion is detected, for example. A margin in which the trailing end of the double feed portion completely passes through the document transporting roller 31a may be included in the timing.

When it comes to this timing, the ADF control section 67 controls to decrease the transporting speed of the document transporting roller 31a from a predetermined document transporting speed or to stop the document transporting roller 31a. Thus, the sheet P2 is decelerated or stopped. More specifically, the ADF control section 67 may decrease the speed of the document transporting roller 31a to a predetermined speed, or may stop the document transporting roller 31a after the deceleration. More particularly, the ADF control section 67 may stop the document transporting roller 31a at the instant. On the other hand, the sheet P1 keeps the predetermined transporting speed to be transported to the downstream side.

FIG. 5 is an explanatory view showing a state in which the sheets P1 and P2 are fed as overlapped in the case of L11≦L3<L12. In this case, the ADF control section 67 waits until the double feed portion is positioned between the document transporting roller 31a and the document transporting roller 31c, the sheet P1 is nipped between the document transporting roller 31c and the driven roller 32c at the downstream side, and the sheet P2 is nipped between the document transporting roller 31a and the driven roller 32a at an upstream side of the sheet P2.

When it comes to this timing, the ADF control section 67 controls to decrease the transporting speed of the document transporting roller 31a from a predetermined document transporting speed or to stop the document transporting roller 31a. Further, the roller pair can be separated in FIG. 5. In this case, the ADF control section 67 energizes the first separating/contacting solenoid 70a so as to move the first separating/contacting lever 54a, whereby the driven roller 32b is separated from the document transporting roller 31b. Thus, the document transporting roller 31b is brought into a state capable of freely moving a sheet. The sheet P2 is separated from the sheet P1 by the deceleration or stop of the document transporting roller 31a.

FIG. 6 is an explanatory view showing a state in which the sheets P1 and P2 are fed as overlapped in the case of L12≦L3<L13. In this case, the ADF control section 67 waits until the double feed portion is positioned between the document transporting roller 31a and the document transporting roller 31d, the sheet P1 is nipped between the document transporting roller 31d and the driven roller 32d at the downstream side, and the sheet P2 is nipped between the document transporting roller 31a and the driven roller 32a at the upstream side of the sheet P2.

When it comes to this timing, the ADF control section 67 controls to decrease the transporting speed of the document transporting roller 31a from a predetermined document transporting speed or to stop the document transporting roller 31a. Further, the roller pair can be separated in FIG. 6. In this case, the ADF control section 67 energizes the first separating/contacting solenoid 70a so as to move the first separating/contacting lever 54a, whereby the driven roller 32b is separated from the document transporting roller 31b. Further, the ADF control section 67 energizes the second separating/contacting solenoid 70b so as to move the second separating/contacting lever 54b, whereby the driven roller 32c is separated from the document transporting roller 31c. Thus, the document transporting rollers 31b and 31c are brought into a state capable of freely moving a sheet. The sheet P2 is separated from the sheet P1 by the deceleration or stop of the document transporting roller 31a.

When the double feed portion is equal to L13 or longer than L13, i.e., when L3≧L13, the ADF control section 67 may reverse the document transporting rollers 31a and 31b and the document feeding roller 29 at a predetermined speed so as to return the sheets P1 and P2 to the document tray 27 for re-feeding, when the trailing end of the double feed portion passes through the document double feed sensor 43. Upon the re-feeding, the sheet P2 receives again the separating operation by the document separation roller 30.

A timer used for the ADF control section 67 to obtain each timing for the control in the aforementioned sheet separating operation will be explained. FIGS. 7A to 7C and 8A and 8B are explanatory views for explaining the function of the timer.

In this embodiment, the ADF control section 67 has three timers Tc1, Tc2, and Tc3. The timer Tc1 is a timer with the leading end of the sheet P1 as a reference. The timer Tc2 is a timer with the leading end of the double feed portion as a reference. The timer Tc3 is a timer with the trailing end of the double feed portion as a reference.

Figure 7A:
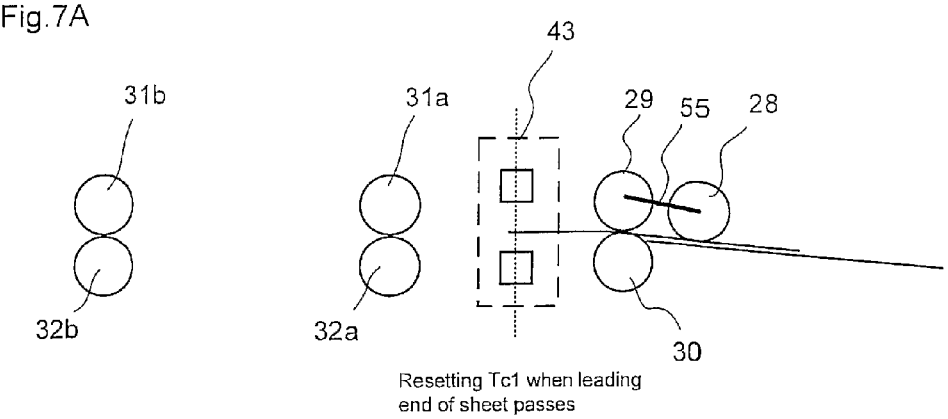
FIGS. 7A to 7C are first explanatory views for explaining a function of a timer used in the sheet separating device according to the present invention.
Figure 7B:
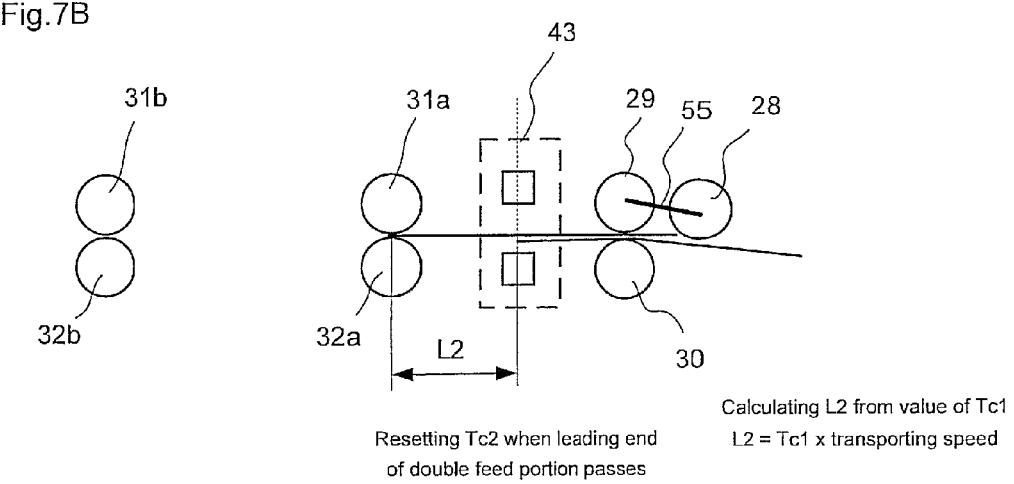

Specifically, when the document double feed sensor 43 detects a leading end of a new sheet from a state where there is no sheet, the ADF control section 67 resets the timer Tc1. FIG. 7A shows a state in which the timer Tc1 is reset. Thereafter, the timer Tc1 keeps running until the timer Tc1 detects the leading end of the next sheet. When the document double feed sensor 43 detects the passage of the leading end of the double feed portion, the ADF control section 67 resets the timer Tc2. FIG. 7B shows a state in which the timer Tc2 is reset. The ADF control section 67 samples the timer Tc1 at this time so as to calculate the length L2 up to the double feed portion. Then, the timer Tc2 keeps running, and when the timer Tc2 reaches the greatest value, it stops. When the leading end of the next double feed portion is detected, it is reset again.

Figure 7C:
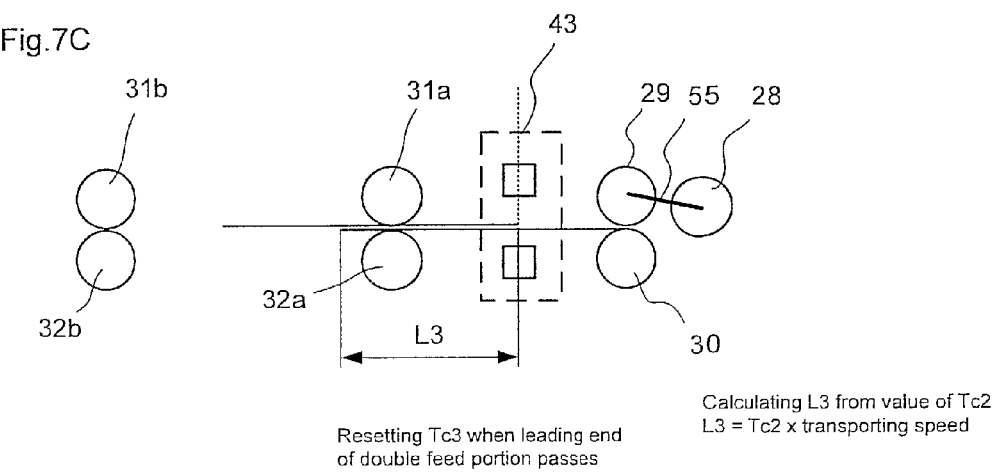

When the document double feed sensor 43 detects the passage of the trailing end of the double feed portion, the ADF control section 67 resets the timer Tc3. FIG. 7C shows a state in which the timer Tc3 is reset. The ADF control section 67 samples the timer Tc2 at this time so as to calculate the length L3 of the double feed portion. Thereafter, the timer Tc3 keeps running, and when the timer Tc3 reaches the greatest value, it stops. When the trailing end of the next double feed portion is detected, the timer Tc3 is reset again.

Figure 8A:
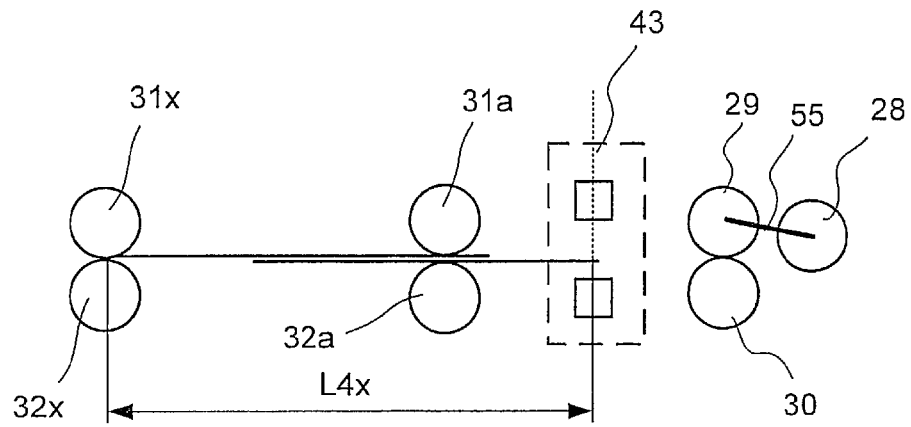
FIGS. 8A and 8B are second explanatory views for explaining a function of a timer used in the sheet separating device according to the present invention.
Figure 8B:
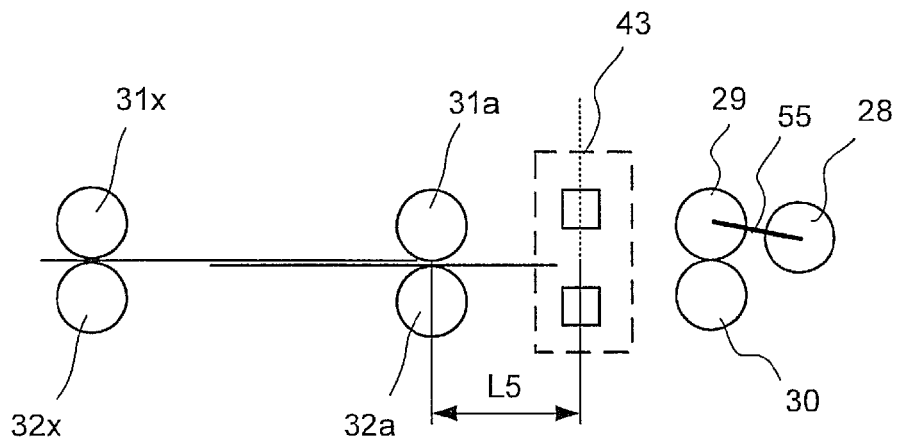

Herein, it is assumed that one of the document transporting rollers 31b, 31c and 31d selected according to the length of L3 is defined as a document transporting roller 31x, and the distance between the document transporting rollers 31a and 31x is defined as L4x. The ADF control section 67 monitors the timer Tc1 and waits until the time corresponding to the length L4x elapses. FIG. 8A shows this state. As shown in FIG. 8A, the leading end of the sheet P1 reaches the document transporting roller 31x. The sheet P1 is nipped between the document transporting roller 31x and the driven roller 32x. At the same time, the ADF control section 67 monitors the timer Tc3 and waits until the time corresponding to the length L5 elapses. FIG. 8B shows this state. As shown in FIG. 8B, the trailing end of the double feed portion reaches the document transporting roller 31a. Only the sheet P2 is nipped between the document transporting roller 31a and the driven roller 32a. When both conditions are satisfied, the transporting speed of the document transporting roller 31a is controlled to be reduced from the predetermined document transporting speed, or the document transporting roller 31a is controlled to be stopped. Accordingly, the difference is produced between the transporting speed of the sheet P1 and the transporting speed of the sheet P2.

Procedure of Sheet Separating Process

Figure 12:
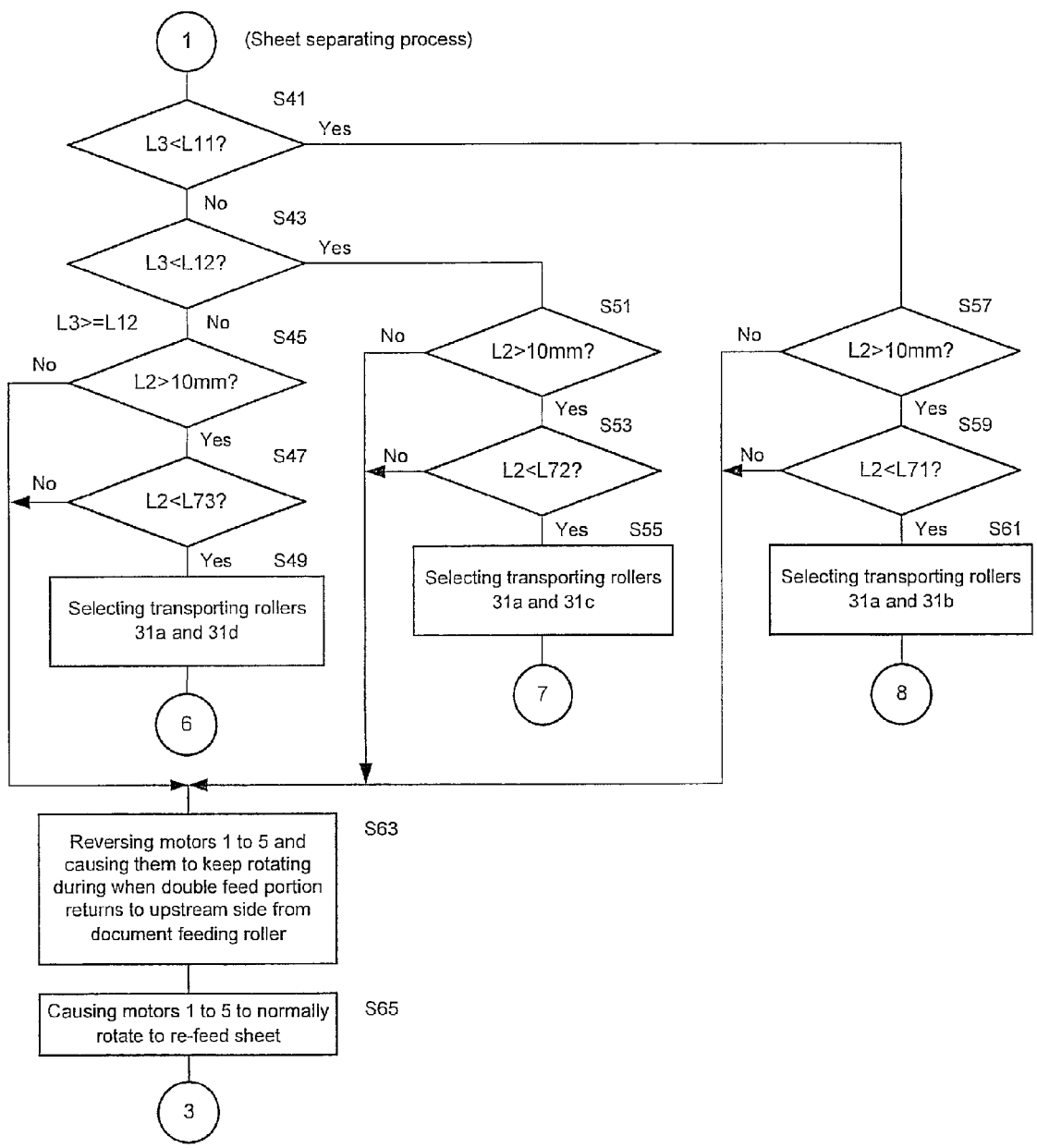
FIG. 12 is a second flowchart showing a procedure of a sheet separating process according to the present invention.
Figure 16:
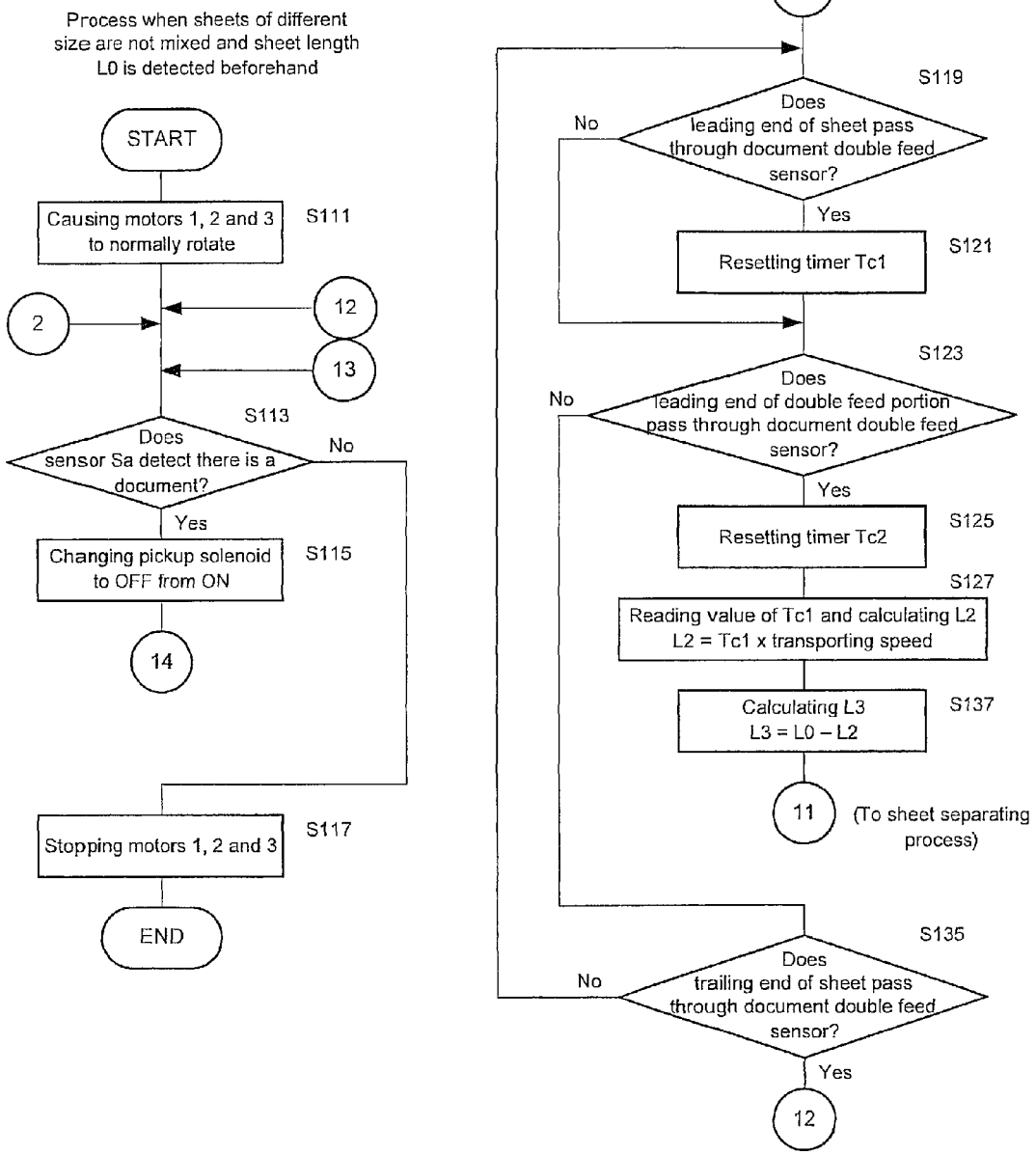
FIG. 16 is a sixth flowchart showing a procedure of a sheet separating process according to the present invention.
Figure 17:
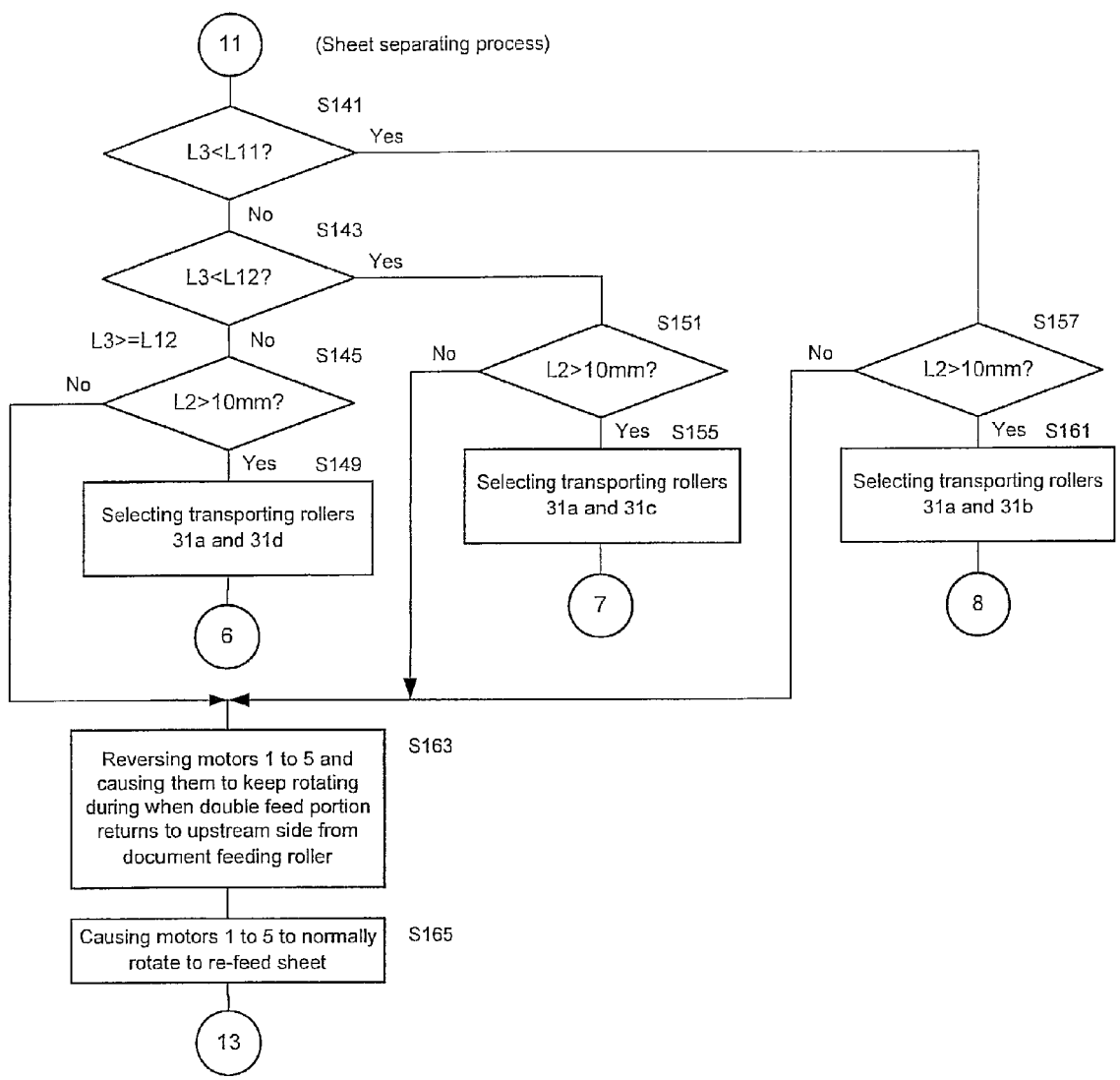
FIG. 17 is a seventh flowchart showing a procedure of a sheet separating process according to the present invention.

The procedure of a sheet separating process executed by the main CPU and sub-CPU will be explained below in detail. FIGS. 11 and 12 are flowcharts showing the procedure of the sheet separating process executed by the main CPU and the sub-CPU. FIGS. 16 and 17 are flowcharts showing the process on the assumption that sheets having different length are mixedly present. These flowcharts mainly represent the procedure of the sub-CPU whose target is a document, but they are not limited thereto. On the other hand, FIGS. 16 and 17 are flowcharts showing the process on the assumption that the length of each sheet is agreed with each other. These flowcharts mainly represent the procedure of the main CPU whose target is a printing sheet of a standard size, but they are not limited thereto. The procedure of the process will be explained below with reference to the flowcharts.

In FIG. 11, when the process for feeding a document is started, the sub-CPU 56 firstly causes the first motor 58, second motor 63, and third to fifth motors 65a, 65b, and 65c to rotate normally (step S11). Then, the sub-CPU 56 monitors the document sensor Sa so as to determine whether there is a document on the document tray 27 or not (step S13). When there is no document, the routine proceeds to step S17 where each of the aforementioned motors are stopped to end the process.

On the other hand, when it is determined in step S13 that there is a document, the sub-CPU 56 excites the pickup solenoid 60 for a predetermined period to lower the pickup arm 55 in order to feed the uppermost sheet. The fed sheet is transported to the document double feed sensor 43 with a leading end of the fed sheet passing through the document feeding roller 29.

The sub-CPU 56 repeatedly executes the processes at the following steps S19 to S35 to determine a state of the sheet on the basis of the signal from the document double feed sensor 43 and to control the timers Tc1, Tc2, and Tc3. The above-mentioned process is repeated until the trailing end of the sheet, which is transported without being fed as overlapped, is detected, or until the double feed is detected and the passage of the trailing end of the double feed portion through the document double feed sensor 43 is detected. The repeated process is as follows. Firstly, the sub-CPU 56 determines whether the leading end of the sheet passes or not (step S19). When the passage of the leading end is detected, the timer Tc1 is reset (step S21). Then, it is determined whether the passage of the leading end of the double feed portion is detected or not (step S23). When the leading end of the double feed portion is detected, the timer Tc2 is reset (step S25), and the length L2 from the leading end of the sheet to the double feed portion is calculated (step S27). Then, it is determined whether the trailing end of the double feed portion is detected (step S29). When the trailing end of the double feed portion is detected, the timer Tc3 is reset (step S31), and the length L3 of the double feed portion is calculated (step S33). Then, the routine proceeds to the sheet separating process in step S41 and the following steps. On the other hand, when the trailing end of the double feed portion is not detected in step S29, the routine proceeds to step S35 so as to determine whether the passage of the trailing end of the sheet is detected or not. When the trailing end is detected, the routine proceeds to the step S13 to feed the next sheet. On the other hand, when the trailing end of the double feed portion is not detected in the step S29, the routine proceeds to step S19 to repeat the monitoring of the document double feed sensor 43.

FIG. 12 shows the sheet separating process in step S41 and the following steps. Firstly, the sub-CPU 56 compares the length L3 of the double feed portion and the distance L11 from the document transporting roller 31a to the document transporting roller 31b (step S41). When L3<L1, the sub-CPU 56 determines whether or not the distance L2 from the leading end of the sheet to the double feed portion is a length to the extent that it can be nipped by the document transporting roller 31b and the driven roller 32b (step S57). One example of the length is 10 mm, but it is not limited thereto. When L2 is not more than 10 mm, the routine proceeds to later-described step S63 to return the sheets P1 and P2 to the document tray 27. When the length L2 is greater than 10 mm, the sub-CPU 56 compares the length L2 and the length L71 (step S59). This is done for determining whether or not the leading end of the sheet P1 goes over the document registration roller 33 when the double feed portion reaches the position between the document transporting roller 31a and the document transporting roller 31b. When the length L2 is not less than L71, the routine proceeds to later-described step S63 to return the sheets P1 and P2 to the document tray 27. On the other hand, when the length L2 is greater than L71, the sub-CPU selects the document transporting rollers 31a and 31b for the separation of sheets (step S61), and then, proceeds to step S91 in FIG. 15. Here, the sub-CPU waits until the double feed portion reaches the position between the document transporting roller 31a and the document transporting roller 31b.

On the other hand, when it is determined in the step S41 that L3≧L11, the sub-CPU 56 compares the distance L12 between the document transporting roller 31a and the document transporting roller 31c and the length L3 of the double feed portion (step S43). When L3<L12, the sub-CPU 56 determines whether or not the distance L2 from the leading end of the sheet to the double feed portion is a length to the extent that it can be nipped by the document transporting roller 31c and the driven roller 32c (step S51). When L2 is not more than 10 mm, the routine proceeds to later-described step S63 to return the sheets P1 and P2 to the document tray 27. When the length L2 is greater than 10 mm, the sub-CPU 56 compares the length L2 and the length L72 (step S53). This is done for determining whether or not the leading end of the sheet P1 goes over the document registration roller 33 when the double feed portion reaches the position between the document transporting roller 31a and the document transporting roller 31c. When the length L2 is not less than L72, the routine proceeds to later-described step S63 to return the sheets P1 and P2 to the document tray 27. On the other hand, when the length L2 is greater than L72, the sub-CPU selects the document transporting rollers 31a and 31c for the separation of sheets (step S61), and then, proceeds to step S81 in FIG. 14. Here, the sub-CPU waits until the double feed portion reaches the position between the document transporting roller 31a and the document transporting roller 31c.

On the other hand, when it is determined in the step S43 that L3≧L12, the sub-CPU 56 determines whether or not the distance L2 from the leading end of the sheet to the double feed portion is a length to the extent that it can be nipped by the document transporting roller 31d and the driven roller 32d (step S45). When L2 is not more than 10 mm, the routine proceeds to later-described step S63 to return the sheets P1 and P2 to the document tray 27. When the length L2 is greater than 10 mm, the sub-CPU 56 compares the length L2 and the length L73 (step S47). This is done for determining whether or not the leading end of the sheet P1 goes over the document registration roller 33 when the double feed portion reaches the position between the document transporting roller 31a and the document transporting roller 31d. When the length L2 is not less than L73, the routine proceeds to later-described step S63 to return the sheets P1 and P2 to the document tray 27. On the other hand, when the length L2 is greater than L73, the sub-CPU 56 selects the document transporting rollers 31a and 31d for the separation of sheets (step S49), and then, proceeds to step S71 in FIG. 13. Here, the sub-CPU 56 waits until the double feed portion reaches the position between the document transporting roller 31a and the document transporting roller 31c.

Subsequently, the process in step S63 and the following steps for returning the sheets P1 and P2 to the document tray 27 will be explained. The routine proceeds to step S63 according to the result of the determination in steps S45, S47, S51, S53, S57 and S59. In step S63, the sub-CPU 56 reverses the first motor 58, second motor 63 and third to fifth motors 65a, 65b, and 65c. The period of the reverse is defined to be longer than the period obtained by adding the length (L6−L5), i.e., the distance from the document double feed sensor 43 to the document feeding roller 29, to the time indicated by the timer Tc2 at the point of starting the reverse, i.e., the lapse of time from when the leading end of the double feed portion passes through the document double feed sensor 43 to when the reverse is started. It is to be noted that this is when the transporting speed in the normal rotation and the transporting speed of the reverse rotation are equal to each other. When the transporting speed of the normal rotation and the transporting speed of the reverse rotation are different from each other, the reverse time is determined considering the difference in the transporting speed. Accordingly, the double feed portion is returned to the upstream side from the document feeding roller 29. Thereafter, the sub-CPU 56 causes each of the motors that are reversed in the step S63 to rotate normally so as to re-feed the returned sheet P1 (step S65).

Figure 13:
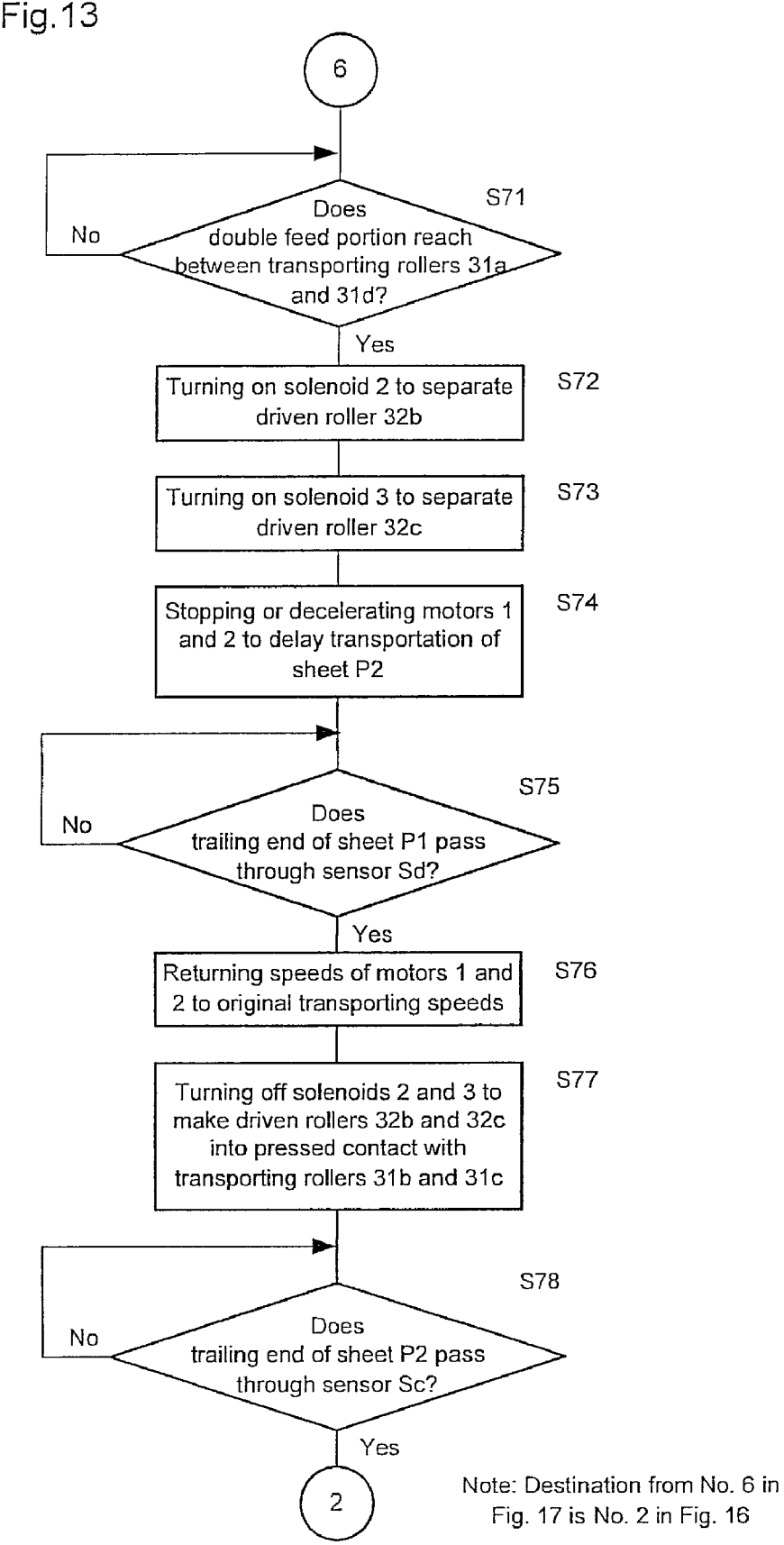
FIG. 13 is a third flowchart showing a procedure of a sheet separating process according to the present invention.

Next, the process subsequent to the step S49 will be explained with reference to FIG. 13. In FIG. 13, the sub-CPU 56 waits until the double feed portion reaches the position between the document transporting rollers 31a and 31d (step S71). Specifically, as described in the explanation of FIG. 8, the sub-CPU 56 monitors the timers Tc1 and Tc3, and waits until the timer Tc1 reaches the time corresponding to the length L43 and the timer Tc3 reaches the time corresponding to the length L5. When the timers Tc1 and Tc3 reach the predetermined times respectively, the sub-CPU 56 turns on the first separating/contacting solenoid 70a so as to separate the driven roller 32b from the document transporting roller 31b (step S72). Then, the sub-CPU 56 turns on the second separating/contacting solenoid 70b so as to separate the driven roller 32c from the document transporting roller 31c (step S73). Then, the first motor 58 and the second motor 53 is stopped or decelerated (step S74). Thus, the sheet P2 is delayed with respect to the sheet P1, whereby both sheets are separated from each other.

The sub-CPU 56 also monitors the sheet passage sensor Sd, and waits until the passage of the trailing end of the sheet P1 is detected (step S75). The sheet passage sensor Sd is arranged between the document transporting roller 31d and the document registration roller 33. When the trailing end of the sheet P1 is detected, the transporting speeds of the second motor 63 and the first motor 58 are returned to the original speed (step S76). Then, the solenoids 2 and 3 are turned off so as to bring the driven rollers 32b and 32c into pressed contact with the document transporting rollers 31b and 32c (step S77). Accordingly, the sheet P2 is transported after the sheet P1 at some intervals. Then, the sub-CPU 56 monitors a sheet passage sensor Sc and waits until the passage of the trailing end of the sheet P2 is detected (step S78). The sheet passage sensor Sc is arranged between the document transporting rollers 31a and 31b. When the trailing end of the sheet P2 is detected, the routine proceeds to step S13 so as to execute the feeding process for the next sheet.

Figure 14:
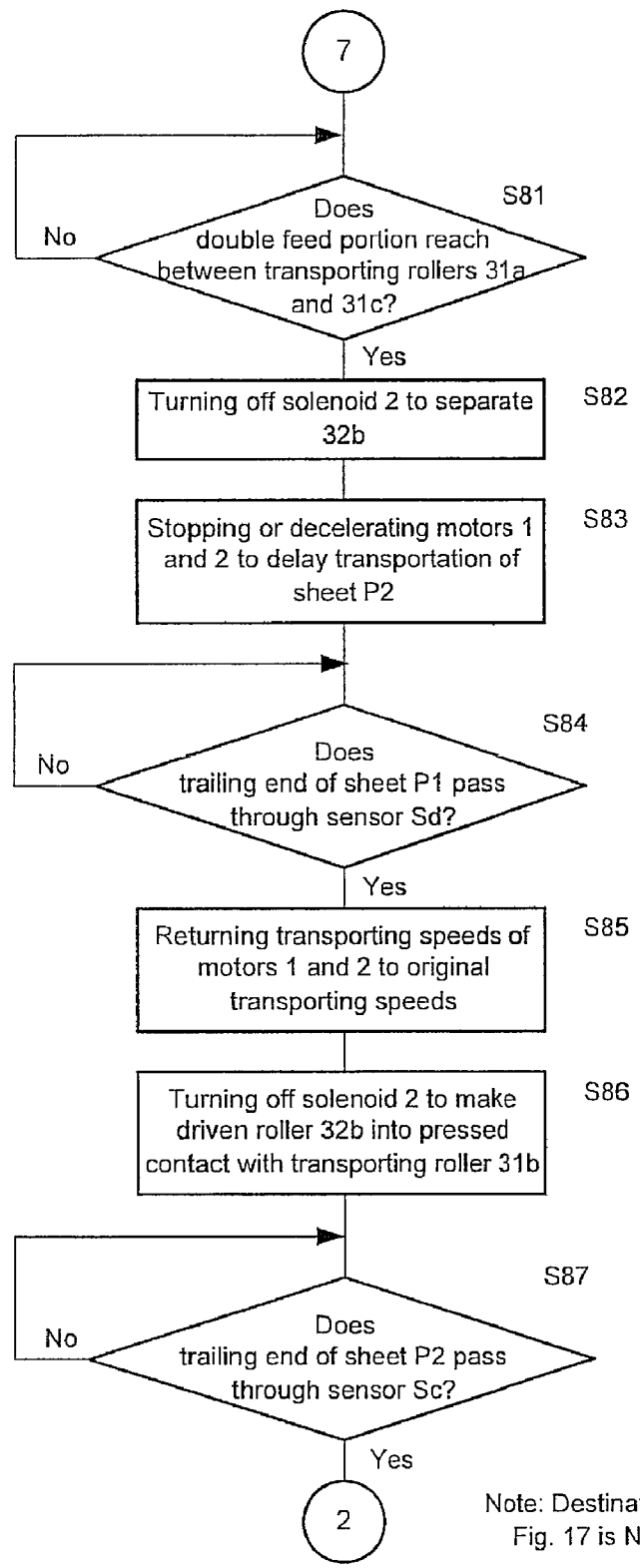
FIG. 14 is a fourth flowchart showing a procedure of a sheet separating process according to the present invention.

Next, the process subsequent to the step S55 will be explained with reference to FIG. 14. In FIG. 14, the sub-CPU 56 waits until the double feed portion reaches the position between the document transporting rollers 31a and 31c (step S81). Specifically, as described in the explanation of FIG. 8, the sub-CPU 56 monitors the timers Tc1 and Tc3, and waits until the timer Tc1 reaches the time corresponding to the length L42 and the timer Tc3 reaches the time corresponding to the length L5. When the timers Tc1 and Tc3 reach the predetermined times respectively, the sub-CPU 56 turns on the first separating/contacting solenoid 70a so as to separate the driven roller 32b from the document transporting roller 31b (step S82). Then, the first motor 58 and the second motor 63 is stopped or decelerated (step S83). Thus, the sheet P2 is delayed with respect to the sheet P1, whereby both sheets are separated from each other.

The sub-CPU 56 also monitors the sheet passage sensor Sd, and waits until the passage of the trailing end of the sheet P1 is detected (step S84). The sheet passage sensor Sd is arranged between the document transporting roller 31b and the document registration roller 33. When the trailing end of the sheet P1 is detected, the transporting speeds of the second motor 63 and the first motor 58 are returned to the original speed (step S85). Then, the solenoid 2 is turned off so as to bring the driven roller 32b into pressed contact with the document transporting roller 31b (step S86). Accordingly, the sheet P2 is transported after the sheet P1 at some intervals. Then, the sub-CPU 56 monitors the sheet passage sensor Sc and waits until the passage of the trailing end of the sheet P2 is detected (step S87). The sheet passage sensor Sc is arranged between the document transporting rollers 31a and 31b. When the trailing end of the sheet P2 is detected, the routine proceeds to step S13 so as to execute the feeding process for the next sheet.

Figure 15:
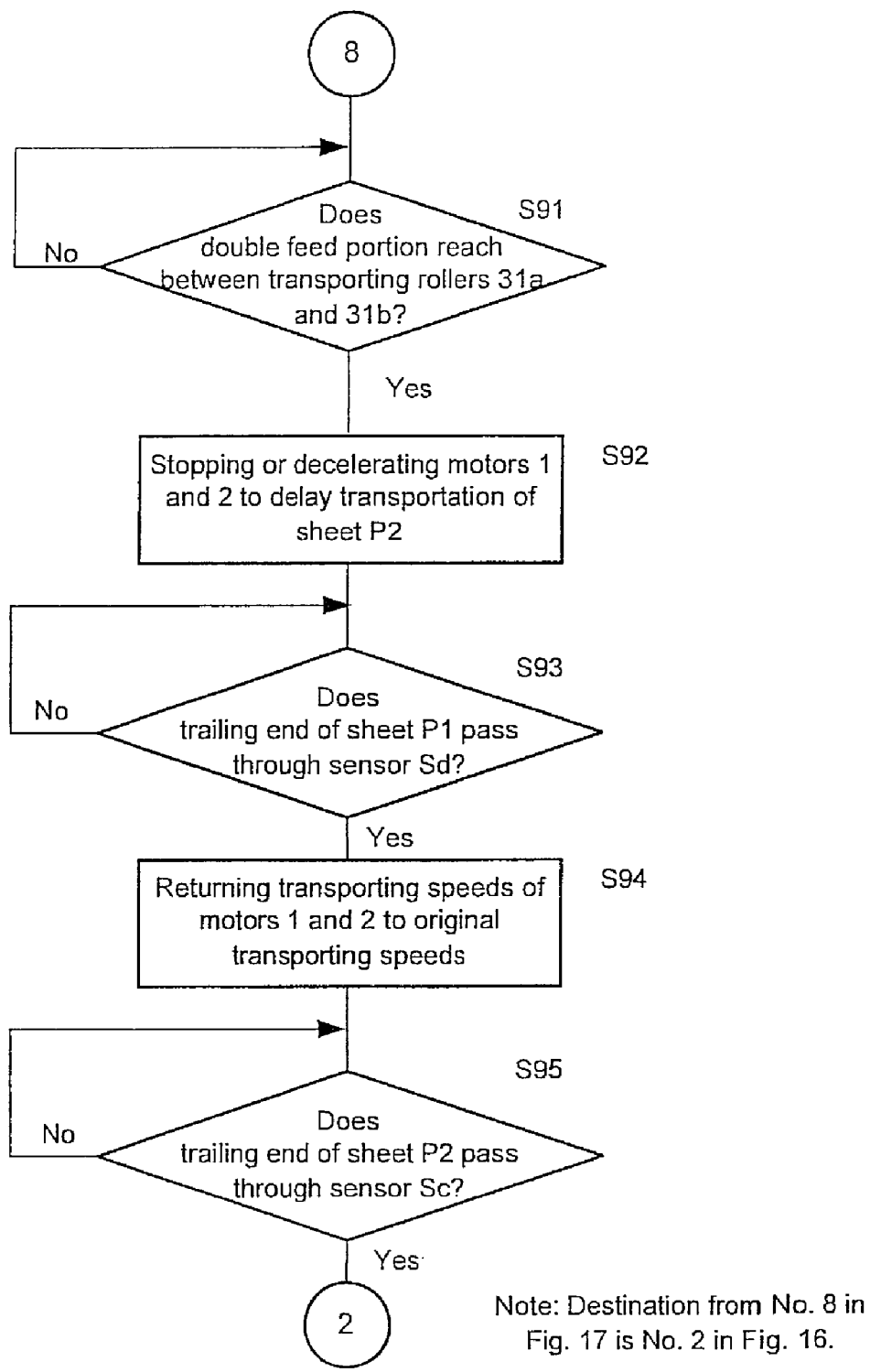
FIG. 15 is a fifth flowchart showing a procedure of a sheet separating process according to the present invention.

Next, the process subsequent to the step S61 will be explained with reference to FIG. 15. In FIG. 15, the sub-CPU 56 waits until the double feed portion reaches the position between the document transporting rollers 31a and 31b (step S91). Specifically, as described in the explanation of FIG. 8, the sub-CPU 56 monitors the timers Tc1 and Tc3, and waits until the timer Tc1 reaches the time corresponding to the length L41 and the timer Tc3 reaches the time corresponding to the length L5. When the timers Tc1 and Tc3 reach the predetermined times respectively, the sub-CPU 56 stops or decelerates the first motor 58 and the second motor 63 (step S92). Thus, the sheet P2 is delayed with respect to the sheet P1, whereby both sheets are separated from each other.

The sub-CPU 56 also monitors the sheet passage sensor Sd, and waits until the passage of the trailing end of the sheet P1 is detected (step S93). The sheet passage sensor Sd is arranged between the document transporting roller 31b and the document registration roller 33. When the trailing end of the sheet P1 is detected, the transporting speeds of the second motor 63 and the first motor 58 are returned to the original speed (step S94). Accordingly, the sheet P2 is transported after the sheet P1 at some intervals. Then, the sub-CPU 56 monitors the sheet passage sensor Sc and waits until the passage of the trailing end of the sheet P2 is detected (step S95). The sheet passage sensor Sc is arranged between the document transporting rollers 31a and 31b. When the trailing end of the sheet P2 is detected, the routine proceeds to step S13 so as to execute the feeding process for the next sheet.

Next, the case in which the sizes of the sheets to be fed are equal, and the sheets have the size that can be detected when they are placed on the document tray 27 will be explained. Specifically, the case in which the length of each sheet is found to be L0 before the feeding will be explained. In this case, the sub-CPU 56 can calculate the length L2 from the leading end of the sheet P1 to the leading end of the double feed portion and the length L3 of the double feed portion at the point when the document double feed sensor 43 detects the leading end of the double feed portion. Then, the sub-CPU 56 can execute the sheet separating process according to the result of the calculation. Therefore, the sub-CPU 56 can execute the separation of the sheets without waiting for the detection of the trailing end of the double feed portion.

FIGS. 16 and 17 show the procedure in this case. In FIG. 16, each process in steps S111 to S121 corresponds to the process in steps S11 to 21 in FIG. 11. For example, the step S111 in FIG. 16 corresponds to the step S11 in FIG. 11 having the last two figures same as those of the step S111. The same relationship is applied to the other steps. Therefore, the explanation of each step described above is omitted.

In step S123, the sub-CPU 56 determines whether the passage of the leading end of the double feed portion is detected or not. When the leading end of the double feed portion is detected, the sub-CPU 56 resets the timer Tc2 (step S125) so as to calculate the length L2 from the leading end of the sheet to the double feed portion (step S127). The sub-CPU 56 also calculates the length L3 of the double feed portion (step S137). The length L0 of the sheet has already been obtained on the basis of the result of the detection of the document length sensor 39. Further, the length from the leading end of the sheet P1 to the leading end of the double feed portion has already been obtained in the step S127. Therefore, the length L3 of the double feed portion can be calculated by calculating the length L2 from the length L0 of the sheet. Thereafter, the routine proceeds to the sheet separating process in FIG. 17.

On the other hand, when the double feed portion is not detected in the step S123, the routine proceeds to step S135 so as to determine whether the passage of the trailing end of the sheet is detected or not. When the trailing end is detected, the routine proceeds to the step S113 so as to feed the next sheet. On the other hand, when the leading end of the double feed portion is not detected in the step S135, the routine proceeds to the step S119 so as to repeat monitoring the document double feed sensor 43.

FIG. 17 shows the sheet separating process after the step S141. Each step corresponds to the step in FIG. 12 having the last two digit same as the step in FIG. 17. It is to be noted that there are no processes in FIG. 17 corresponding to steps S47, S53 and S59 in FIG. 12. In this embodiment, when the distance from the document double feed sensor 43 to the document registration roller 33 is sufficiently long, and the leading end of the document of a maximum size reaches the document registration roller 33, it is assumed that its trailing end passes through the document double feed sensor 43. Therefore, the determinations in steps S47, S53, and S59 in FIG. 12 are unnecessary. In case where the trailing end of the document of the maximum size is positioned before the document double feed sensor 43 when the leading end thereof reaches the document registration roller 33, it is preferable that the determinations corresponding to steps S47, S53, and S59 are executed.

It is to be noted that, when the explanation is applied to the sheet transporting device at the main body, the document pickup roller 28 may be replaced by the pickup roller 11a, the document feeding roller 29 may be replaced by the feeding roller 11b, and the document separation roller 30 may be replaced by the separation roller 11c. Further, the document double feed sensor 43 may be replaced by the double feed sensor 53, the document transporting roller 31 may be replaced by the transporting roller 51, the driven roller 32 may be replaced by the driven roller 52, and the document registration roller 33 may be replaced by the registration roller 18.

Various modifications are possible for the present invention in addition to the embodiment described above. It should be understood that such modifications also fall within the aspects and scope of the present invention. The present invention is intended to embrace all alterations made within the scope of the invention defined by the appended claims and their equivalents.

What is claimed is:

1. A sheet transporting device comprising: a sheet feeding section that feeds plural sheets one by one to a transporting path;
   three or more roller pairs that are arranged at predetermined positions along the transporting path and that nip and transport a sheet;
   a double feed detecting section that detects a length of a double feed portion, which is an overlapped portion, when sheets are fed in such a manner that another sheet (a delaying sheet) is overlapped with one sheet (a preceding sheet);
   a selecting section that selects two of the three or more roller pairs based on the length of the double feed portion; and
   a transport control section that can change a transporting speed of at least one of the selected roller pairs,
   wherein the selecting section selects two roller pairs that have a space between which the double feed portion can be positioned, and the transport control section controls the transporting speeds of the selected roller pairs such that the speeds differ from each other to separate the delaying sheet from the preceding sheet,
   the selecting section selects two roller pairs such that one or more roller pair(s) are positioned between the selected two roller pairs, the roller pair(s) positioned between the selected two roller pairs being switched between a transporting state for transporting a sheet and a free state in which the sheet can freely move, and
   the transport control section changes a state of the roller pair(s) positioned between the selected roller pairs into the free state for separating the sheets.

2. The sheet transporting device according to claim 1, further comprising:
   a driving section that drives and causes each roller pair to transport a sheet; and
   a drive switching section that switches a drive between a state in which the roller pair(s) is driven and a state in which the roller pair(s) is not driven;
   wherein the transport control section can bring the roller pair(s) into the free state by causing the drive switching section to switch the drive into the state in which the roller pair(s) is not driven.

3. The sheet transporting device according to claim 1, wherein
   the roller pair(s) positioned between the selected two roller pairs includes a separating/contacting mechanism for separating and contacting the rollers constituting the roller pair(s) from each other, and
   the transport control section brings the roller pair(s) into the free state by separating the rollers from each other.

4. The sheet transporting device according to claim 1, wherein
   the transport control section delays the transportation of the delaying sheet overlapped with the preceding sheet by decelerating or stopping an upstream roller pair of the selected roller pairs.

5. The sheet transporting device according to claim 4, wherein
   the sheet feeding section includes a sheet separating section for separating one sheet from stacked sheets, and
   the transport control section decelerates or stops the upstream roller pair after the overlapped delaying sheet passes through the sheet separating section when the delaying sheet is fed as overlapped with a trailing end of the preceding sheet.

6. The sheet transporting device according to claim 4, further comprising:
- a registration roller that is arranged at a downstream side from a downstream roller pair, and feeds a sheet at a predetermined timing after temporarily stopping a leading end of the transported sheet at a predetermined position, wherein
- the transport control section decelerates or stops the upstream roller pair before the delaying sheet overlapped with the preceding sheet reaches the registration roller.

7. The sheet transporting device according to claim 5, further comprising:
- a size acquiring section for acquiring a size of the stacked sheets before the feeding, wherein
- the double feed detecting section further detects a length from a leading end of the preceding sheet to a leading end of the double feed portion, and
- the transport control section calculates a difference between a length of the acquired size in the transporting direction and the length from the leading end of the preceding sheet to the leading end of the double feed portion and defines the difference as the length of the double feed portion.

8. An automatic document feeder comprising the sheet transporting device according to claim 1.

9. An image forming apparatus comprising the sheet transporting device according to claim 1.

* * * * *